US006903659B2

(12) United States Patent
Vanderah et al.

(10) Patent No.: US 6,903,659 B2
(45) Date of Patent: Jun. 7, 2005

(54) LOW POWER REGULATOR SYSTEM AND METHOD

(75) Inventors: Richard J. Vanderah, Marshalltown, IA (US); Paul R. Adams, Marshalltown, IA (US); David E. Woolums, Frisco, TX (US); Jon B. Milliken, Marshalltown, IA (US)

(73) Assignee: Fisher Controls International LLC., St. Louis, MO (US)

( * ) Notice: Subject to any disclaimer, the term of this patent is extended or adjusted under 35 U.S.C. 154(b) by 16 days.

(21) Appl. No.: 10/679,558

(22) Filed: Oct. 6, 2003

(65) Prior Publication Data

US 2004/0078117 A1 Apr. 22, 2004

Related U.S. Application Data

(60) Division of application No. 09/796,902, filed on Feb. 28, 2001, which is a continuation-in-part of application No. 09/603,157, filed on Jun. 23, 2000, now Pat. No. 6,441,744.
(60) Provisional application No. 60/141,576, filed on Jun. 29, 1999.

(51) Int. Cl.[7] .............................................. G08B 17/10

(52) U.S. Cl. .............................. 340/636.1; 340/636.15; 340/636.19; 340/626; 700/296

(58) Field of Search ................................. 340/626, 610; 137/551, 557

(56) References Cited

U.S. PATENT DOCUMENTS

| 3,633,416 A | 1/1972 | Van Dyke ..................... 73/199 |
| 3,846,774 A | 11/1974 | Thorbard et al. ........ 340/239 R |
| 4,423,484 A | 12/1983 | Hamilton .................... 364/420 |

(Continued)

FOREIGN PATENT DOCUMENTS

| DE | 41 34 034 A1 | 10/1991 |
| DE | 40 25 323 | 2/1992 |
| DE | 94 04 829.0 | 6/1994 |
| EP | 0 660 017 A1 | 12/1994 |
| EP | 0 703 516 A2 | 3/1996 |
| EP | 0 708 389 A1 | 4/1996 |
| EP | 0 937 992 A1 | 8/1999 |

OTHER PUBLICATIONS

Tatarini, "Data Logger LOGT 600" Brochure (Sep. 1998).

Fisher–Rosemount Insruction Manual Form 5661, RF 5661, RF 100 Series, pp. 1–32 (2000).

Fisher–Rosemount Bulletin 71.X:RF100, "RF 100 Series Pressure and Flow Recorders," pp. 1–12 (2000).

International Search Report for PCT/US00/17538 (Oct. 25, 2000).

International Search Report PCT/US02/01810 (Jun. 23, 2003).

International Preliminary Examination Report for PCT/US02/01810 (Oct. 1, 2003).

*Primary Examiner*—Julie Bichngoc Lieu
(74) *Attorney, Agent, or Firm*—Marshall, Gerstein & Borun LLP

(57) ABSTRACT

Methods are disclosed for collecting sensor data in a pressure regulator system including a controller and a plurality of sensors. The controller and each of the individual sensors are activated as required to collect sensor data during a sampling period thereby reducing the amount of power consumed by the pressure regulator system. Further power conservation measures are implemented by using a battery sensor to monitor the capacity of the pressure regulator battery and placing the pressure regulator in reduced power consumption operating modes as the capacity of the battery is reduced.

18 Claims, 14 Drawing Sheets

U.S. PATENT DOCUMENTS

| | | | |
|---|---|---|---|
| 4,581,707 A | 4/1986 | Millar | 364/509 |
| 5,047,965 A | 9/1991 | Zlokovitz | 364/558 |
| 5,197,328 A | 3/1993 | Fitzgerald | 73/168 |
| 5,251,148 A | 10/1993 | Haines et al. | 364/509 |
| 5,600,230 A | 2/1997 | Dunstan | 320/48 |
| 5,636,653 A | 6/1997 | Titus | 137/14 |
| 5,728,942 A | 3/1998 | Boger | 73/756 |
| 5,991,827 A | 11/1999 | Ellenby et al. | 710/8 |
| 6,035,878 A | 3/2000 | Adams et al. | 137/1 |
| 6,055,831 A | 5/2000 | Barbe | 68/12.18 |
| 6,056,008 A | 5/2000 | Adams et al. | 137/487.5 |
| 6,150,823 A * | 11/2000 | Takahashi et al. | 324/427 |
| 6,169,381 B1 * | 1/2001 | Arai et al. | 318/560 |
| 6,178,997 B1 | 1/2001 | Adams et al. | 137/487.5 |
| 6,385,119 B2 | 5/2002 | Kobayashi et al. | 365/227 |

* cited by examiner

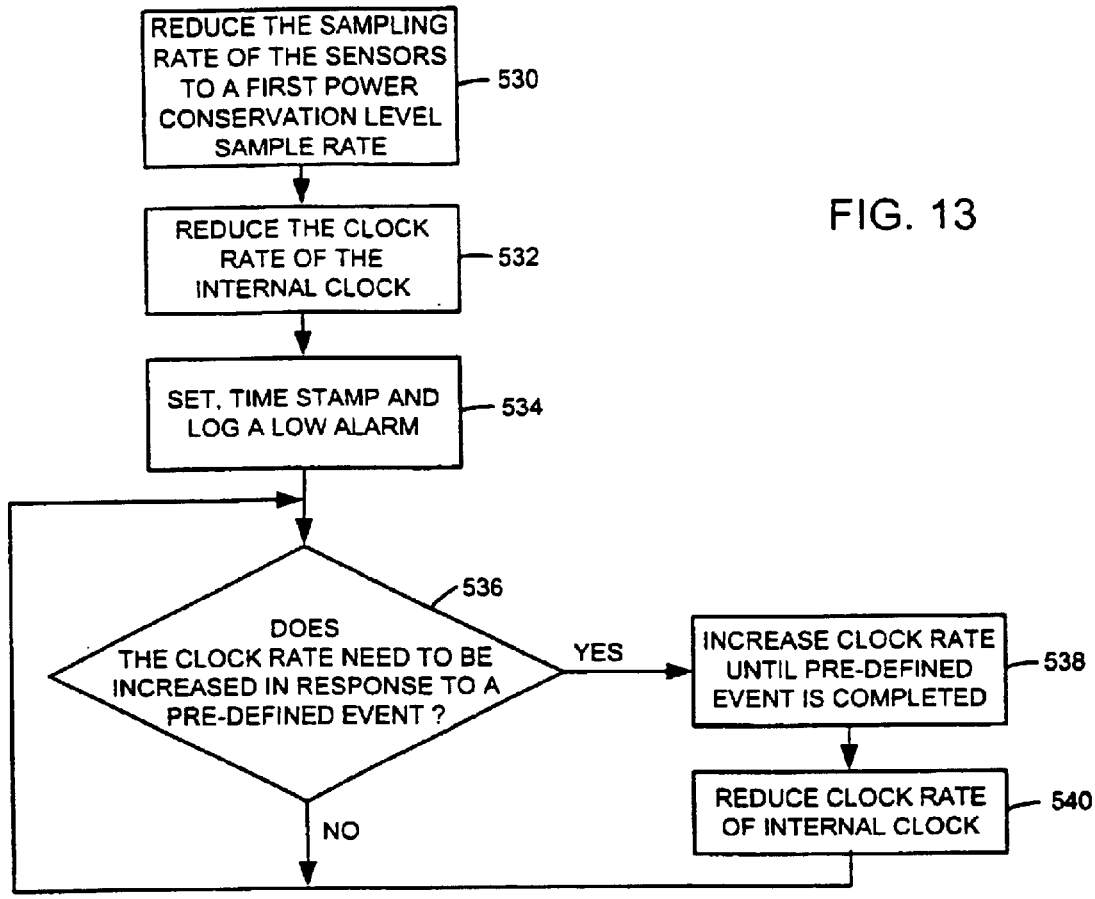
FIG. 13
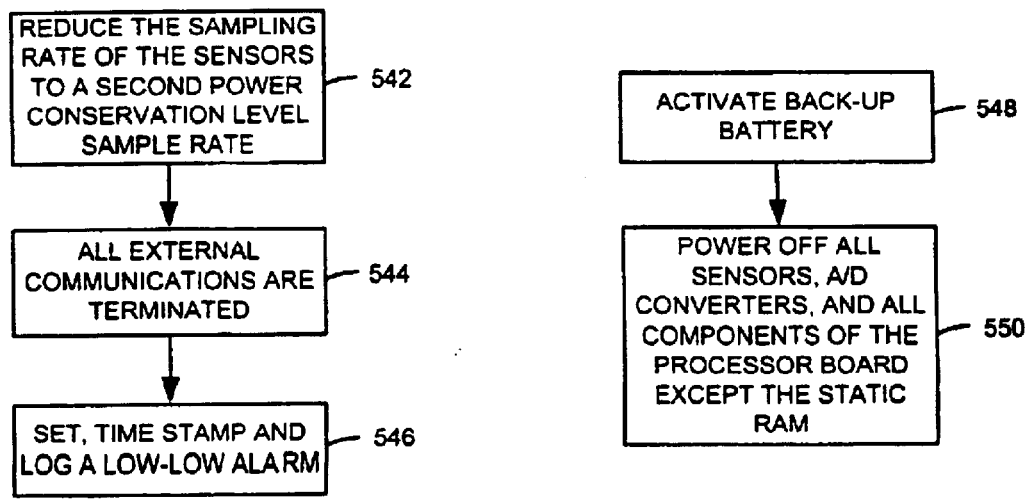
FIG. 14
FIG. 15 the present invention generally relates to a flow regulator
LOW POWER REGULATOR SYSTEM AND METHOD

CROSS-REFERENCE TO RELATED APPLICATION

This is a Divisional of U.S. application Ser. No. 09/796,902, filed Feb. 28, 2001, which is a continuation-in-part of U.S. patent application Ser. No. 09/603,157, filed Jun. 23, 2000 now U.S. Pat. No. 6,441,744 which claims priority to Provisional Application Ser. No. 60/141,576, filed Jun. 29, 1999.

FIELD OF THE INVENTION

The present invention generally relates to a flow regulator and more particularly to a low power regulator system and method that selectively powers on and powers off selected regulator components to reduce power consumption.

BACKGROUND OF THE INVENTION

In the control of fluid in industrial processes, such as oil and gas pipeline systems, chemical processes, etc., it is often necessary to reduce and control the pressure of a fluid. Regulators are typically used for these tasks by providing adjustable flow restriction through the regulator. The purpose of the regulator in a given application may be to control flow rate or other process variables, but the restriction inherently induces a pressure reduction as a by-product of its flow control function.

By way of example, a specific application in which regulators are used is the distribution and transmission of natural gas. A natural gas distribution system typically includes a piping network extending from a natural gas field to one or more consumers. In order to transfer large volumes of gas, the gas is compressed to an elevated pressure. As the gas nears the distribution grid and, ultimately, the consumers, the pressure of the gas is reduced at pressure reducing stations. The pressure reducing stations typically use regulators to reduce gas pressure.

It is important for natural gas distribution systems to be capable of providing sufficient volumes of gas to the consumers. The capacity of this system is typically determined by the system pressure, piping size, and the regulators, and system capacity is often evaluated using a simulation model. The accuracy of the system model is determined using flow data at various input points, pressure reducing points, and output points. The pressure reducing points significantly impact the capacity of the gas distribution system, and therefore it is important for the system model to accurately simulate the pressure reducing points. The pressure reducing points, however, are within the distribution system and therefore are not considered custody transfer points (i.e., points at which the control of gas flow switches from the distribution system to the consumer). As a result, flow measurement is typically not provided at the pressure reducing points. Furthermore, since the pressure reducing points are not custody transfer points, the added cost of high accuracy is not required. Flow measurement problems similar to those described above with respect to natural gas distribution are also present in other regulator applications (i.e., industrial processes, chemical processes, etc.).

In addition, regulators are subject to failure due to wear during operation, thereby reducing the ability to control pressure along a pipeline. A damaged regulator may allow fluid to leak, thereby increasing fluid waste and possibly creating a hazardous situation. While damaged regulators may be repaired or replaced, it is often difficult to detect when a regulator has failed and determine which regulator is damaged. Detecting a failure and determining which regulator has failed is more difficult in a typical natural gas delivery system, where pipelines may run several miles.

Prior art regulators are typically operated such that all or most of the regulator components remain powered on at all times. In those cases where a prior art regulator is powered by a battery source, operating such prior art regulators often results in an unnecessary drain in power resources thereby reducing the efficiency of the regulator. In addition, as the regulator battery capacity is reduced as a result of prolonged use or perhaps as a result of a malfunction, continuing to operate a prior art regulator with all or most of the regulator components powered on shortens the time that such a prior art regulator can be operated.

SUMMARY OF THE INVENTION

In accordance with an aspect of the invention, a method is provided for collecting sensor data in a pressure regulator system including a controller and a plurality of sensors where the controller is configured to collect sensor data. The method includes the steps of placing the controller in a first mode and issuing a first controller command to activate a selected sensor from the plurality of sensors. The controller is placed in a second mode for a first predetermined period of time where the controller consumes a reduced amount of power in the second mode than when operating in the first mode. The controller is placed in the first mode again after the first predetermined period has lapsed. A second controller command is issued to collect sensor data from the selected sensor.

In accordance with an alternative aspect of the invention, a method is provided for collecting sensor data in a pressure regulator system including a controller and a plurality of sensors, where the controller is configured to collect sensor data from each of the plurality of sensors during a sampling period. The method includes the steps of activating a first selected sensor of the plurality of sensors, collecting sensor data from the first selected sensor and then deactivating the first selected sensor. A second selected sensor of the plurality of sensors is then activated. Sensor data is collected from the second selected sensor and then the second selected sensor is deactivated.

In accordance with another aspect of the invention, a pressure regulator is provided for controlling fluid in a pipeline where the pressure regulator is operated by a battery. The pressure regulator includes a battery sensor, a memory and a controller. The battery sensor is adapted to sense an operation parameter of the battery and generate an operation parameter signal. The memory is adapted to store a threshold capacity value of the battery and generate a threshold capacity signal. The controller unit controls the power consumption of the pressure regulator. More particularly, the controller is adapted to receive the operation parameter signal and the threshold capacity signal and generate a command signal to operate the pressure regulator in at least one of a plurality of operating modes.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures, and in which:

FIG. 13 is a flow chart schematically illustrating a method of placing the gas flow regulator in a first power conservation mode.

FIG. 14 is a flow chart schematically illustrating a method of placing the gas flow regulator in a second power conservation mode.

FIG. 15 is a flow chart schematically illustrating a method of placing the gas flow regulator in a fail safe mode.

DETAILED DESCRIPTION OF THE PREFERRED EMBODIMENTS

Figure 1:
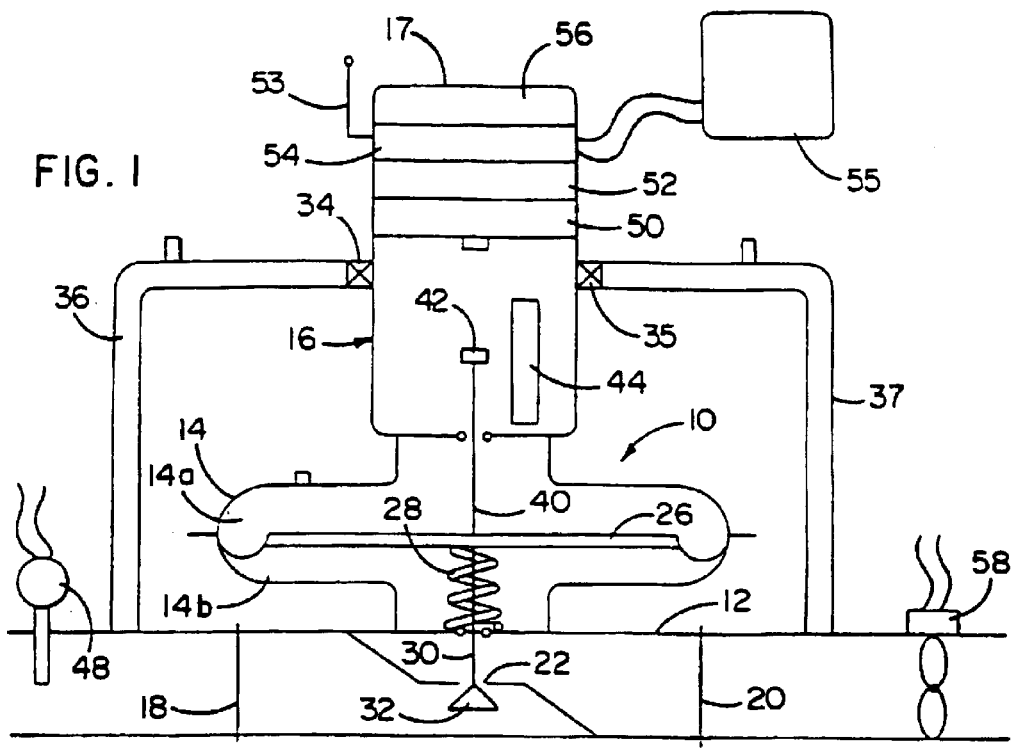
FIG. 1 is a schematic diagram illustrating a regulator with flow measuring apparatus in accordance with the present invention.

FIG. 1 illustrates a preferred embodiment of a fluid pressure regulator, such as a gas pressure regulator 10, in accordance with the invention. The illustrated gas pressure regulator 10 includes gas flow measuring apparatus as will be described hereinafter wherein upstream pressure, downstream pressure, and orifice opening measurements are used to calculate flow and other information. It is to be understood that a liquid pressure regulator also may be provided in accordance with the principles of the invention, as the illustrated gas pressure regulator is merely one example of a fluid pressure regulator according to the invention.

The regulator shown in FIG. 1 includes a regulator body 12, a diaphragm housing 14, and an upper housing 16. Within the regulator body 12, there is provided an inlet 18 for connection to an upstream pipeline and an outlet 20 for connection to a downstream pipeline. An orifice 22 inside the regulator body 12 establishes communication between the inlet 18 and the outlet 20.

A diaphragm 26 is mounted inside the diaphragm housing 14 and divides the housing 14 into upper and lower portions 14a, 14b. A pressure spring 28 is attached to a center of the diaphragm 26 and is disposed in the lower portion of the diaphragm housing 14b to bias the diaphragm 26 in an upward direction.

A stem 30 is attached to and moves with the diaphragm 26. A throttling element, such as a valve disc 32, is attached to a bottom end of the stem 30 and is disposed below the orifice 22. The valve disc 32 is sized to completely block the orifice 22, thereby cutting off communication from the inlet 18 to the outlet 20. Accordingly, it will be appreciated that the pressure spring 28 biases the valve disc 32 in an upward direction to close the orifice 22. The valve disc 32 is formed with a varying cross-section so that, as the valve disc 32 moves downwardly, the unblocked (or open) area of the orifice 22 gradually increases. As a result, the open area of the orifice 22 is directly related to the position of the valve disc 32.

Gas pressure in the upper chamber of the diaphragm 14a is controlled to move the valve disc 32 between the closed and open positions. Pressure in the upper portion of the housing 14a may be provided in a number of different manners. In the present embodiment, pressure in the upper portion 14a is controlled by a loading pilot (not shown). However, the regulator 10 may be of a type which uses a different type of operator, such as an unloading pilot, or the regulator 10 may be self-operated or pressure-loaded, without departing from the scope of the present invention.

A further alternative for controlling the gas pressure in the upper portion of the diaphragm housing 14a includes a first tube running from the upstream piping to the upper portion of the diaphragm housing 14a, with a first solenoid controlling gas flow therethrough. A second tube is also provided which runs from the upper portion of the diaphragm housing 14a to the downstream piping and has a second solenoid disposed therein to control flow therethrough. A PC is connected to the first and second solenoids to control their operation. To increase pressure in the upper portion of the diaphragm housing 14a, the first solenoid is opened to allow upstream pressure into the upper portion, thereby driving the diaphragm 26 downward to open the orifice 22. Gas may be exhausted through the second solenoid to thereby reduce pressure in the upstream portion 14a and raise the diaphragm 26, thereby closing the orifice 22. Regardless of the manner of providing and controlling pressure, it will be appreciated that increased pressure moves the diaphragm 26 and attached valve disc 32 downward to open the orifice 22 while decreased pressure closes the orifice 22. This arrangement is given by way of example only, and is not intended to limit the scope of the present invention, as other arrangements well known in the art may also be used.

In accordance with certain aspects of the present invention, pressure sensors are provided upstream and downstream of the throttling element to measure upstream and downstream pressure levels $P_1$, $P_2$. As illustrated in FIG. 1, the first and second pressure sensors 34, 35 are mounted to the upper housing 16. Tubing 36 extends from the first pressure sensor 34 to tap into piping located upstream of the regulator inlet 18. Additional tubing 37 extends from the second pressure sensor 35 to tap into piping located downstream of the regulator outlet 20. Accordingly, while the first and second pressure sensors 34, 35 are mounted on the upper housing 16, the tubing 36, 37 communicates upstream and downstream gas pressure, respectively, to the first and second pressure sensors 34, 35. In the alternative, the first and second pressure sensors 34, 35 may be located directly in the upstream and downstream piping with wiring running from the pressure sensors to the upper housing 16. To provide for temperature correction, if desired, a process fluid temperature transmitter 48 is located in the upstream piping which measures process temperature.

The upper housing 16 further includes a sensor for determining valve disc position. According to the illustrated embodiment, the stem 30 is attached to the valve disc 32 and is connected to the diaphragm 26. A travel indicator 40, which is preferably an extension of the stem 30, extends from the diaphragm and into the upper housing 16, so that the position of the valve disc 32 corresponds to the position of the valve disc 32. The sensor, therefore, comprises an indicator travel sensing mechanism, preferably a Hall effect sensor. The Hall effect sensor includes a Hall effect magnet 42 attached to an upper end of the travel indicator 40. A magnet sensor 44 is disposed inside the upper housing 16 for sensing the location of the Hall effect magnet 42. By detecting the position of the magnet 42, the location of the valve disc 32 and hence the open area of the orifice 22 may be determined. A second travel indicator (not shown) may be linked to the travel indicator 40 to provide visual indication of valve disc travel. The second travel indicator runs upwardly from the travel indicator 40 and through the upper housing 16 to extend above a top surface of the upper housing 16.

An alternative for measuring travel of the valve disc 32 is the use of a radar transceiver (not shown) disposed above the travel indicator 40 in the upper housing 16. The radar transceiver detects the position of the travel indicator 40 and transmits a signal indicating travel indicator position.

It will be appreciated that the position of the valve disc 32 may be determined in a number of different manners in addition to the magnet 42 and sensor 44 embodiment described above. For example, a laser sensor (not shown) may be provided either in the upper housing 16 to measure the position of the travel indicator 40, or in the diaphragm housing 14 for directly measuring the position of a portion of the diaphragm 26. When the laser sensor is in the latter position, the travel indicator 40 is not needed. In addition, an ultrasonic sensor may be used to determine valve disc position.

Figure 2:
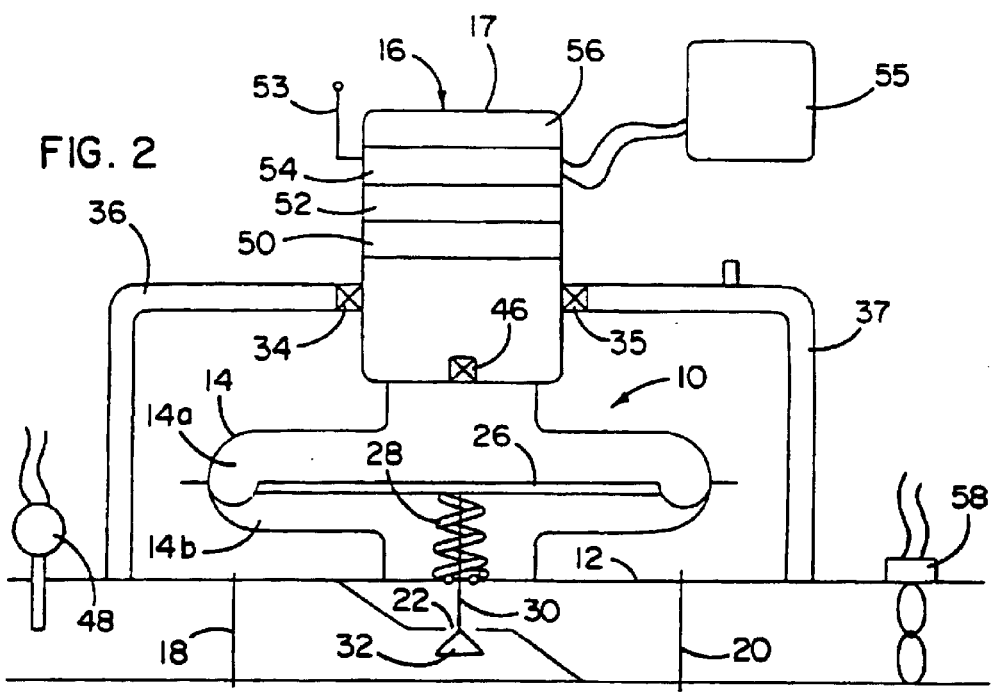
FIG. 2 is a schematic diagram of an additional embodiment of a regulator incorporating flow measuring apparatus.

A further alternative, illustrated at FIG. 2, measures loading pressure in the upper portion of the diaphragm housing 14a to infer valve disc position. It will be appreciated that the position of the valve disc 32 varies with the pressure present in the upper portion 14a of the diaphragm housing. In this embodiment, a loading pressure sensor 46 is provided in the upper housing 16 for measuring pressure at the upper portion of the diaphragm housing 14a. The measured loading pressure may then be used to determine valve disc position.

Returning to the embodiment of FIG. 1, the first and second pressure sensors 34, 35 and the travel sensor 44 provide output which is fed into an electronic flow module 50. The electronic flow module 50 may be provided integrally with the regulator, such as in the upper housing 16 as illustrated in FIG. 1, or may be remotely positioned. The inlet pressure, outlet pressure and valve disc position are used to determine flow through the variable orifice of the regulator 10. For sub-critical gas flow, the flow rate is calculated using the algorithm:

$$F = \text{SQRT}\{\{K\text{SUB1}\} \text{OVER}\{G*T\}\} * K\text{sub2}*Y*P\text{sub 1} * \sin K\text{sub3} \text{SQRT}\{\{P\text{sub1}-P\text{sub2}\} \text{OVER}\} P\text{sub2} 0$$

, where

F=flow rate,
$K_1$=absolute temperature constant,
G=specific gravity of the flow media,
T=absolute temperature of the flow media,
$K_2$=stem position constant,
Y=stem position,
$P_1$=absolute upstream pressure,
$K_3$=trim shape constant, and
$P_2$=absolute downstream pressure.

The stem position and trim shape constants $K_2$, $K_3$ are specific to the particular size and type of regulator, and are primarily dependent on the specific trim size and shape. As those skilled in the art will appreciate, the product of $K_2$ and Y may be equivalent to a traditional flow sizing coefficient. The above algorithm is suitable for calculating sub-critical (i.e., $P_1-P_2<0.5P_1$) gas flow rate through linear, metal trim valve type regulators.

For critical gas flows, the calculation is modified by eliminating the sine function. For other types of regulators, such as non-linear metal trim and elastomeric style regulators, a similar algorithm is used, however the stem position constant $K_2$ becomes a function related to pressure drop ΔP (i.e., the difference in upstream and downstream pressures $P_1-P_2$) and/or valve stem position, as is well known in the art. For liquid flow, the equation becomes:

$$F = \text{SQRT}\{\{K\text{SUB1}\} \text{OVER}\{G*T\}\} * K\text{sub2}*Y* \text{SORT}\{P\text{sub1}-P\text{sub2}\}$$

, where

F=flow rate,
$K_1$=absolute temperature constant,
G=specific gravity of the flow media,
T=absolute temperature of the flow media.
$K_2$=stem position constant,
Y=stem position,
$P_1$=absolute upstream pressure, and
$P_2$=absolute downstream pressure.

A similar calculation is used in the embodiment of FIG. 2, which measures loading pressure in the upper portion of the diaphragm housing 14a to infer valve disc travel, except a loading pressure constant $K_4$ and a gauge loading pressure $P_L$ replace the stem position constant $K_2$ and the stem position Y values. The loading pressure constant $K_4$ is also application specific and must be determined for each type of regulator 10. For non-linear elastomeric throttling members, the loading pressure constant $K_4$ is a function of ΔP and $P_L$.

In the preferred embodiment, a local flow view module 52 is also disposed inside the upper housing 16. The local flow view module 52 includes an electronic flow totalizer which provides totalized flow information. The local flow view module 52 further has an output port which allows access by a hand-held communication device to access the totalized flow and reset the local flow totalizer for future use. In the currently preferred embodiment, the local flow view module 52 includes an LCD readout enclosed inside the upper housing 16. A cap 17 attached to the top of the upper housing 16 has a clear plastic window which allows the LCD readout to be viewed.

A communication module 54 transmits flow data to an auxiliary communication device 55, such as a remote terminal unit (RTU), a PC, or any other device capable of interrogating the regulator controls. The communication module 54 may include an antenna 53 for transmitting flow information to a remote meter reading system (not shown). A power module 56 is also provided for powering the flow measurement mechanism. The power module 56 is capable of providing regulated voltage for the entire device, and may be supplied by any well known source such as solar, battery, and DC or AC power sources.

It will be appreciated that the electronic flow module 50, local flow view module 52, communication module 54, and power module 56 may be separately provided as illustrated in FIG. 1, or may be provided on a single main circuit board located inside the upper housing 16.

The calculated flow rate through the regulator 10 may be quickly and easily calibrated using a separate flow meter 58. The flow meter 58, which may be a turbine or other type of meter, is temporarily inserted into the downstream pipeline to measure actual fluid flow. The flow meter 58 provides feedback to an auxiliary communication device 55 (RTU, PC, etc.) or directly to the main circuit board. The feedback may be used to generate an error function based on observed flow conditions which is then incorporated into the flow calculations performed by the regulator 10, thereby to provide more accurate flow data.

Figure 3:
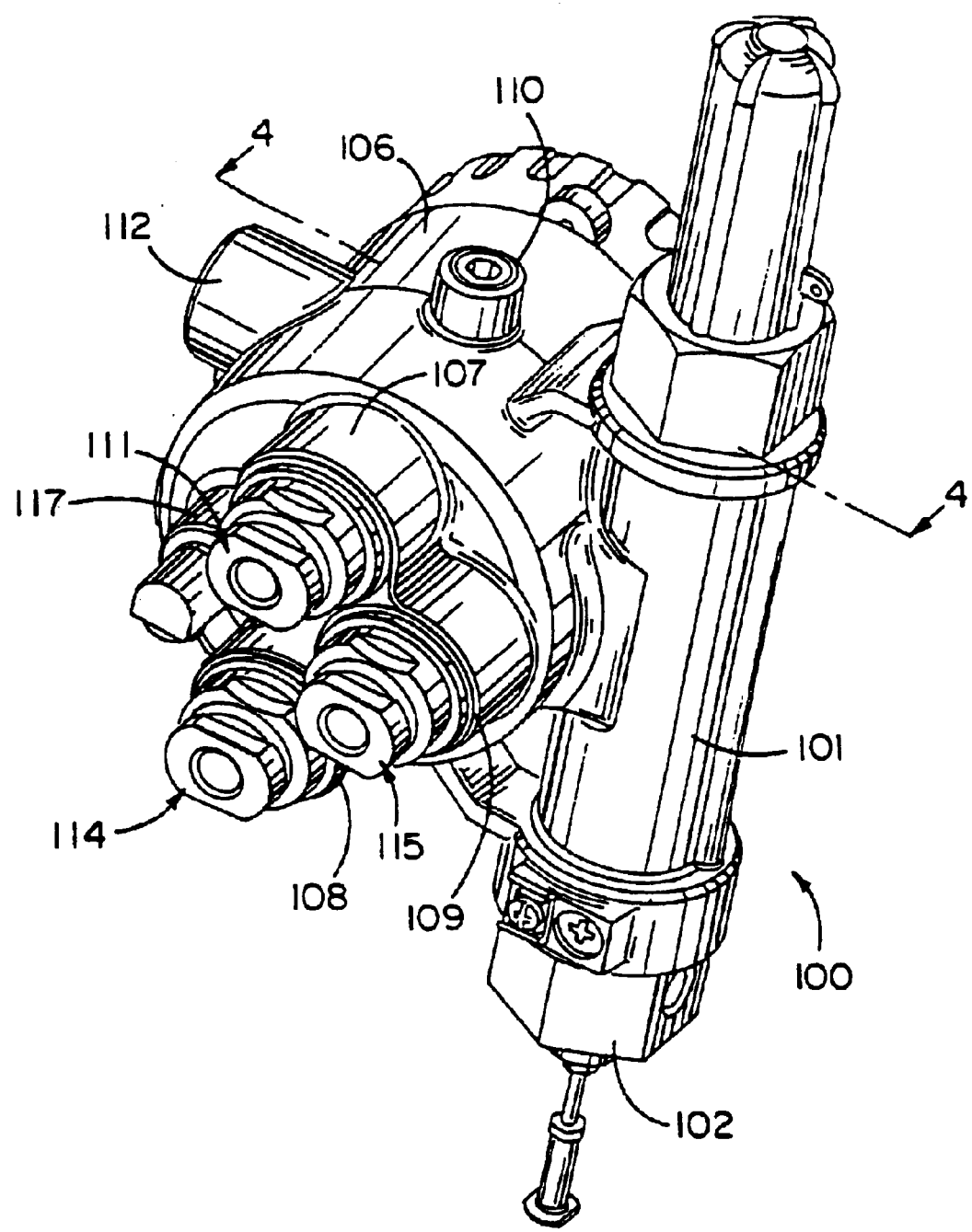
FIG. 3 is a perspective view of the regulator flow measurement apparatus.
Figure 4:
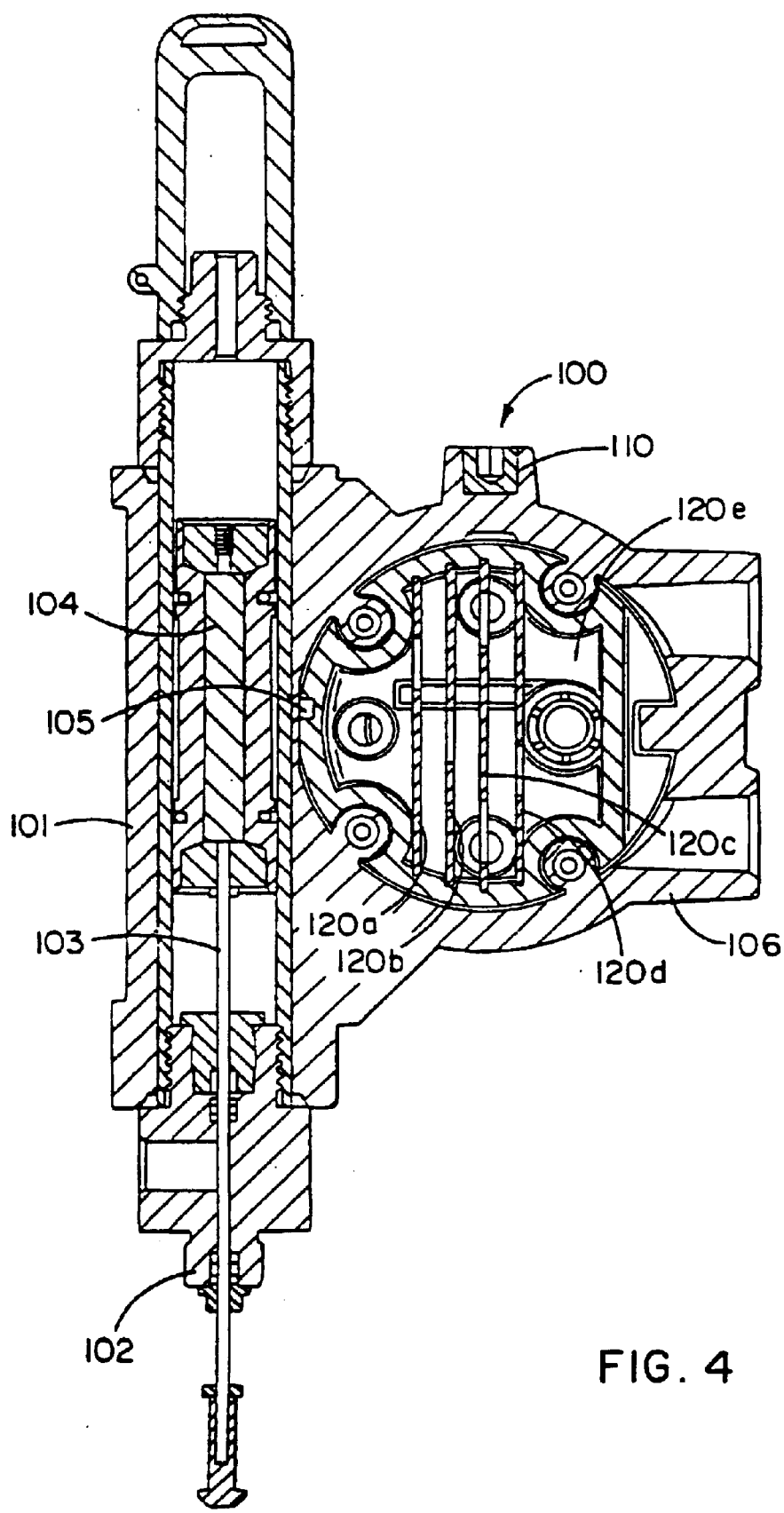
FIG. 4 is a side elevation view, in cross-section, of regulator flow measurement apparatus in accordance with the teachings of the present invention.

A currently preferred embodiment of regulator flow measurement and diagnostic apparatus is illustrated in FIG. 3, generally designated by reference numeral 100. As shown in FIG. 3 the apparatus 100 includes a cylindrical body 101 having a first end 102 adapted for connection to a regulator (not shown). As with the previous embodiments, the regulator is disposed in a fluid flow passage having an upstream section and a downstream section. The cylindrical body 101 encloses a travel indicator 103 (FIG. 4) which is connected to a diaphragm (not shown) in the regulator. According to the illustrated embodiment, a Hall effect sensor is used to detect the position of the travel indicator 103. A portion 104 of the travel indicator 103 is formed of magnetic material having pole pieces. A hall element 105 (FIG. 4) is positioned to detect the magnetic material portion 104 and generate a position signal according to the position of the travel indicator 103.

A housing 106 is attached to the cylindrical body 102 and has a first pressure port 107, a second pressure port 108, an auxiliary pressure port 109, and an auxiliary port 110 (FIG. 3). A first pressure sensor assembly 111 is inserted inside the first pressure port 107, and a tube (not shown) connects the assembly 111 to the upstream section of the flow passage. A second pressure sensor assembly 114 is inserted into the second pressure port 108, and a tube (not shown) connects the second assembly 114 to the downstream section of the flow passage. A third pressure sensor assembly 115 may be inserted into the auxiliary pressure port 109 for measuring at a third pressure point. The third pressure sensor 115 may be used to measure pressure at a variety of locations, including in the flow passage or in the regulator to infer plug travel, as described in greater detail above with regard to the previous embodiment. In a preferred embodiment, a fourth pressure port 117 is provided for measuring atmospheric pressure. The auxiliary port 110 is provided for receiving discrete or analog input from another device, such as the temperature transmitter 48 illustrated in FIG. 1. In addition, an I/O port 112 is provided for connection to an outside device, as described in greater detail below.

Figure 5:
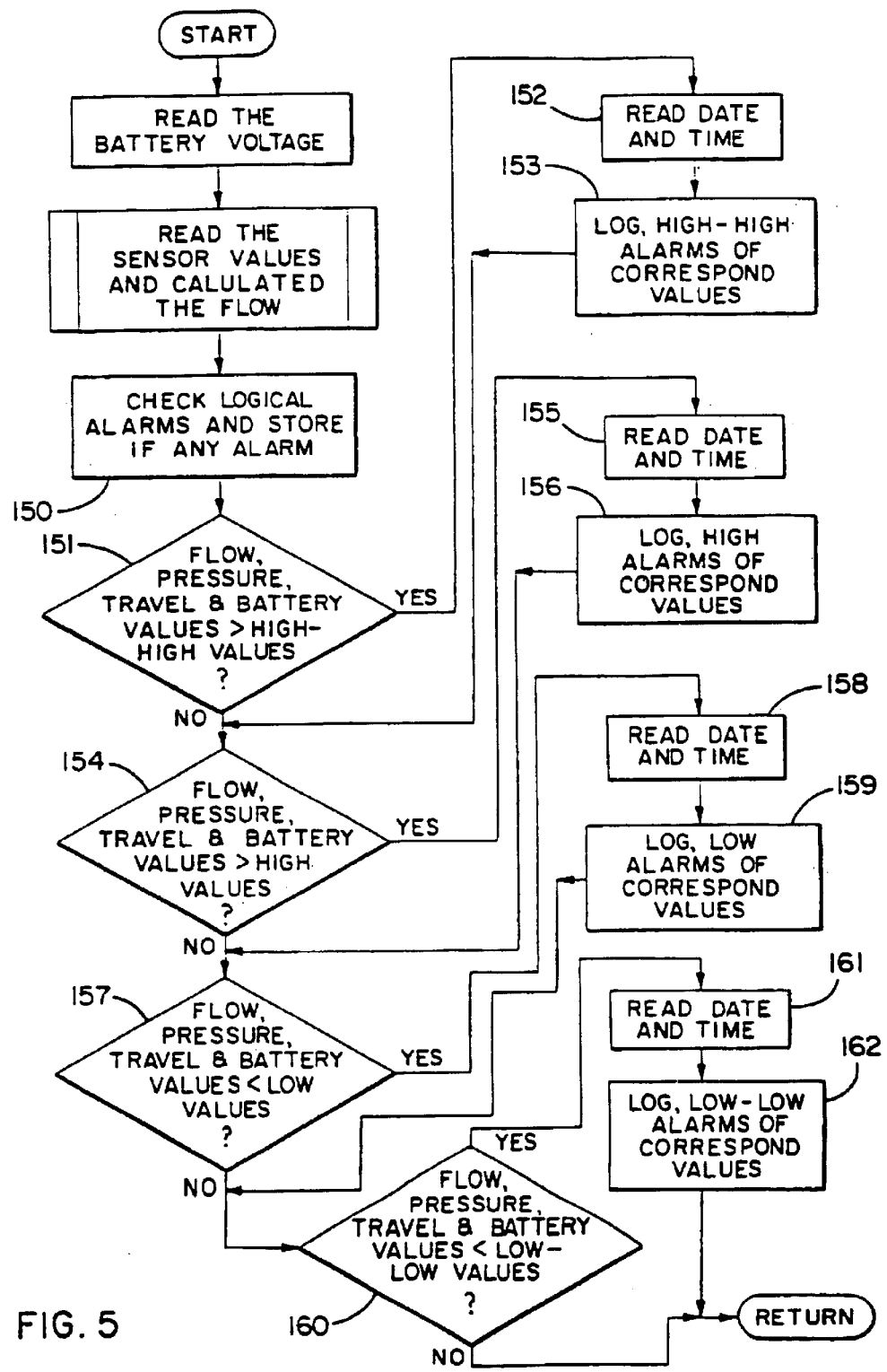
FIG. 5 is a flow chart schematically illustrating a user-specified limit portion of an alarm routine.

A plurality of circuit boards 120a–e are disposed inside the housing 105 for controlling various operations of the apparatus 100 (FIG. 5). In the illustrated embodiment, a first (or main) circuit board 120a may include an interface for the first, second, third pressure sensors, and atmospheric pressure sensors, and a connection for the hall effect sensor 105. A second (or communication) circuit board 120b provides an interface for communication with outside devices. The second circuit board 120b may include connection for wired transmission, such as a modem card, an RS232 communication driver, and a CDPD modem. In addition or alternatively, a transceiver may be provided for wireless communication. A third (or main) circuit board 120c preferably includes a processor, a memory, a real-time clock, and communication drivers for two communication channels. The processor may include, among other things, one or more of the algorithms noted above for calculating flow rate, while the memory may store selected parameters, such as the high and low pressures for each day. An optional fourth circuit board 120d provides an interface for the auxiliary I/O device 55. Examples of such I/O devices may include leak detectors, methane detectors, temperature sensors, and level sensors. A fifth (or termination) board 120e is also provided having a power supply regulator, field termination (for connection to I/O devices), a back-up power supply, and connections into which the other boards 120a–d may plug into. While five circuit boards 120a–e are shown in the illustrated embodiment, it will be appreciated that a single circuit board, less than five circuit boards, or more than five circuit boards may be used without departing from the scope of the invention.

It will be appreciated, therefore, that communication between the apparatus 100 and an outside device may be by RF modem, ethernet or other known communication like. The processor allows the outside devices to enter information such as desired pressure set points and alarm conditions into the apparatus 100, and retrieve data stored in the memory. The data retrieved may include the alarm log and stored operational parameters. For instance, the retrieved information may include a history of upstream and downstream pressures stored periodically in memory, so that the apparatus 100 provides the function of a pressure recorder.

In accordance with certain aspects of the present invention, the processor includes a routine for generating alarm signals. A first portion of the routine compares measured parameters (i.e., the upstream pressure, downstream pressure, and travel position) to certain user-specified limits, as schematically illustrated in FIG. 5. In addition, one or more logic sub-routines may be run which compares at least two of the measured parameters and generates an alarm signal based on a specific logical operation, examples of which are schematically shown in FIGS. 6 and 7A–7D.

Turning first to the level alarms, a check is initiated 150 to determine whether any level limits have been entered by the user. The pressure, travel, flow, and battery values are first compared to user entered high-high limits 151. If any of the values exceeds the high-high limits, the date and time are read 152 and a corresponding high-high alarm is logged 153. Next the measured values are compared to user entered high limits 154. If any of the values exceeds the high limits, the date and time are read 155 and a corresponding high alarm is logged 156. The values are then compared to user entered low limits 157. If any of the values is lower than a user entered low limit, the date and time are read 158 and a corresponding low alarm is logged 159. Finally, the values are compared to user entered low-low limits 160. If any of the values is lower than a low-low limit, the date and time are read 161 and a corresponding low-low alarm is logged 162.

Additional limit alarms may be set based on the calculated flow rate F. For example, a user may enter limits for instantaneous and accumulated flow. When the calculated flow rate F exceeds either of these limits, an alarm is triggered. A further alarm may be provided based on stem travel. The user may enter a limit for accumulated stem travel distance and trigger a maintenance alarm when accumulated stem travel exceeds the limit.

Figures 6, 7A:
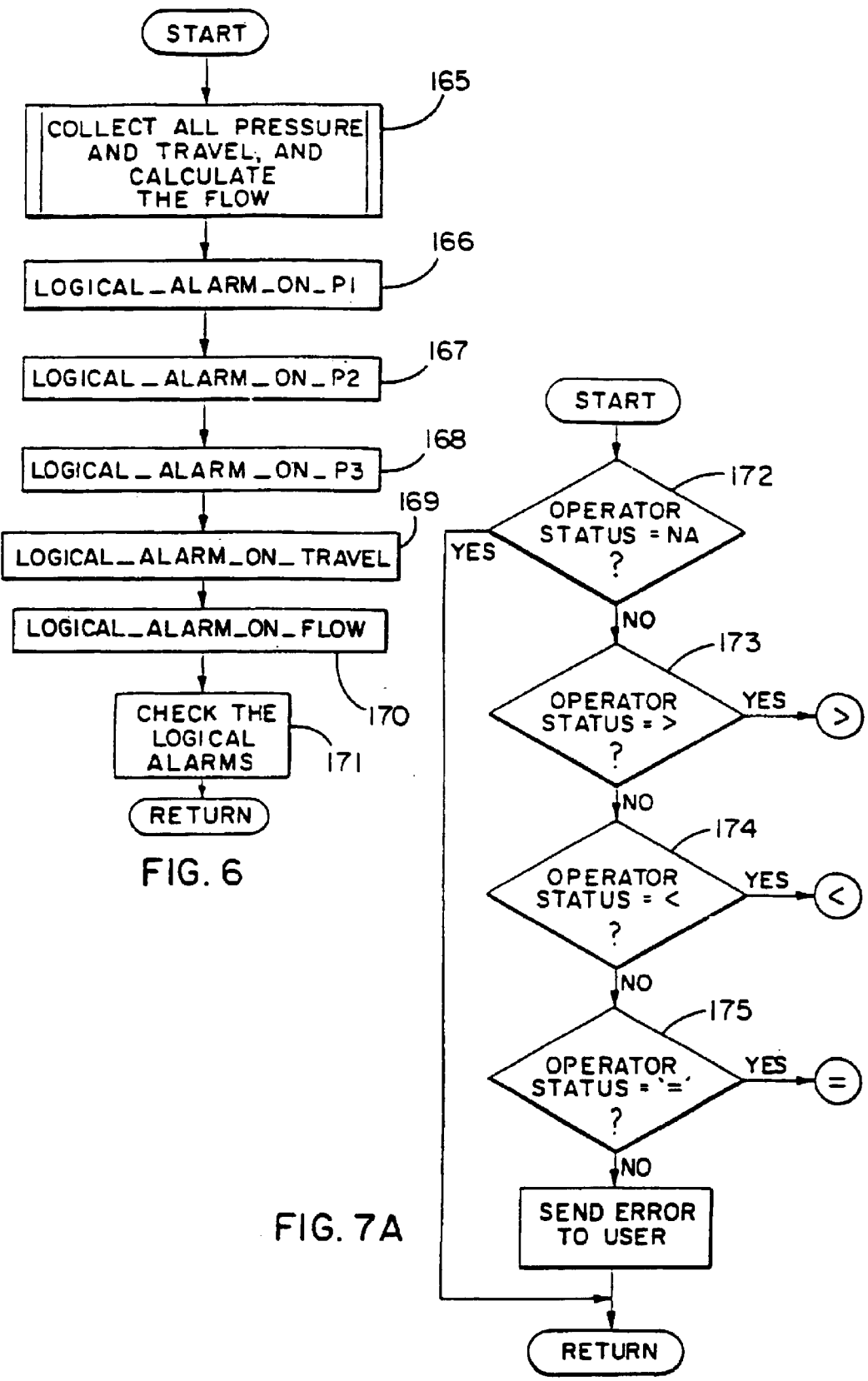
FIG. 6 is a flow chart schematically illustrating a logic alarm sub-routine.
FIGS. 7A–7E are flow charts schematically illustrating specific portions of the logic alarm sub-routine.

After checking the user-entered limit alarms, one or more logic sub-routines may be run to determine if any logical alarm conditions exist. In the preferred embodiment, each of the logic sub-routines is combined into a single, integrated logic sub-routine as generally illustrated in FIG. 6. As shown in FIG. 6, the sub-routine begins by collecting all the pressure and travel data, in calculating the flow 165 through the pressure regulator. Each of the measured parameters is then compared to both the other measured parameters and any user-specified set points. The logical alarms are monitored for upstream pressure 166, downstream pressure 167, auxiliary pressures 168, stem travel 169, and flow rate 170. Additional logical alarms may also be provided for feedback from the third pressure sensor assembly and auxiliary device connected to the I/O connection 112. After obtaining the relative values of each of the parameters, the logical alarms are then checked, as described in greater detail below.

A preferred sequence of operations for determining logical alarms based on upstream pressure (step 166) are schematically shown in FIG. 7A. First, the sub-routine checks for an entered value relating to upstream pressure 172. If a value is entered relating to upstream pressure, the sub-routine determines whether the measured upstream pressure must be greater than 173, less than 174, or equal to 175 the user-entered value. For each relative comparison (i.e., steps 173, 174 and 175), a series of sub-steps are performed as illustrated in FIGS. 7B–7D.

Figure 7B:
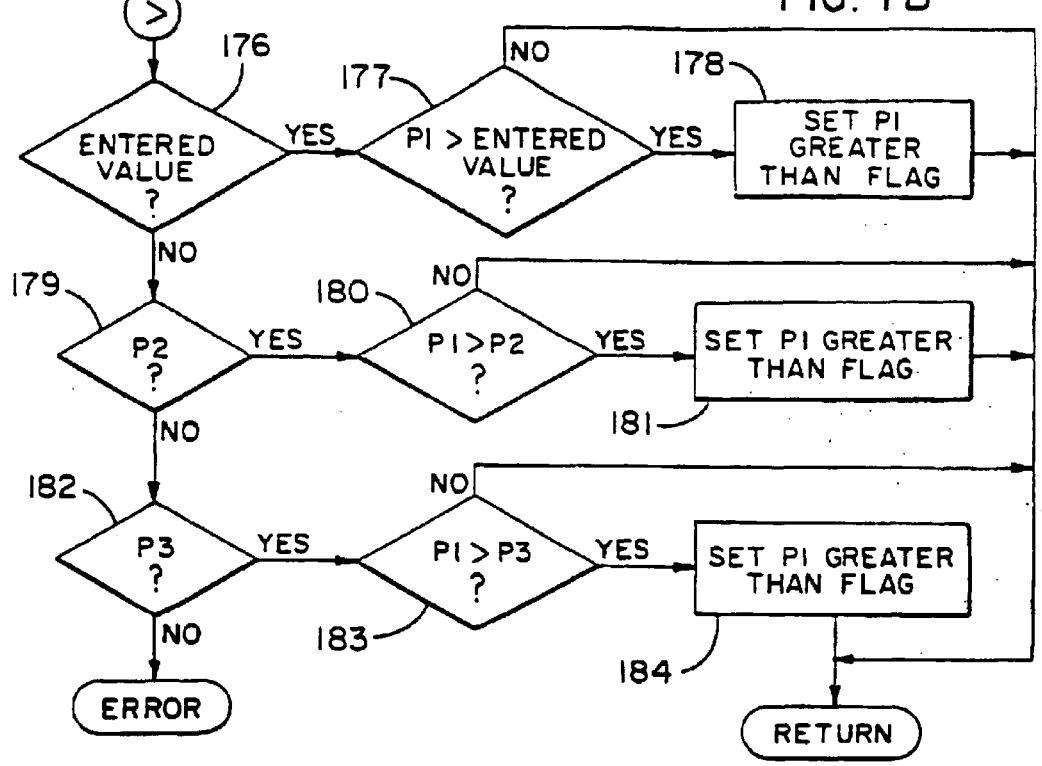

If an alarm requires the upstream pressure to be greater than a certain value, the sub-routine first checks for a specific upstream pressure value entered by the user 176 (FIG. 7B). If the user has entered a value for upstream pressure, the measured upstream pressure is compared to that entered value 177. If the measured value is greater than the entered value, the upstream pressure greater than flag is set 178. If no specific user-entered value is used, the sub-routine checks to see if downstream pressure is to be compared to the upstream pressure 179. If so, the sub-routine determines if the upstream pressure is greater than the downstream pressure 180. If so, the upstream pressure greater than downstream pressure flag is set 181. If downstream pressure is not used as a logical alarm, the sub-routine next checks for a logical alarm value based on auxiliary pressure 182. If auxiliary pressure is used as a logical alarm, the sub-routine checks whether upstream pressure is greater than the downstream pressure 183. If so, the upstream pressure greater than auxiliary pressure flag is set 184.

Figure 7C:
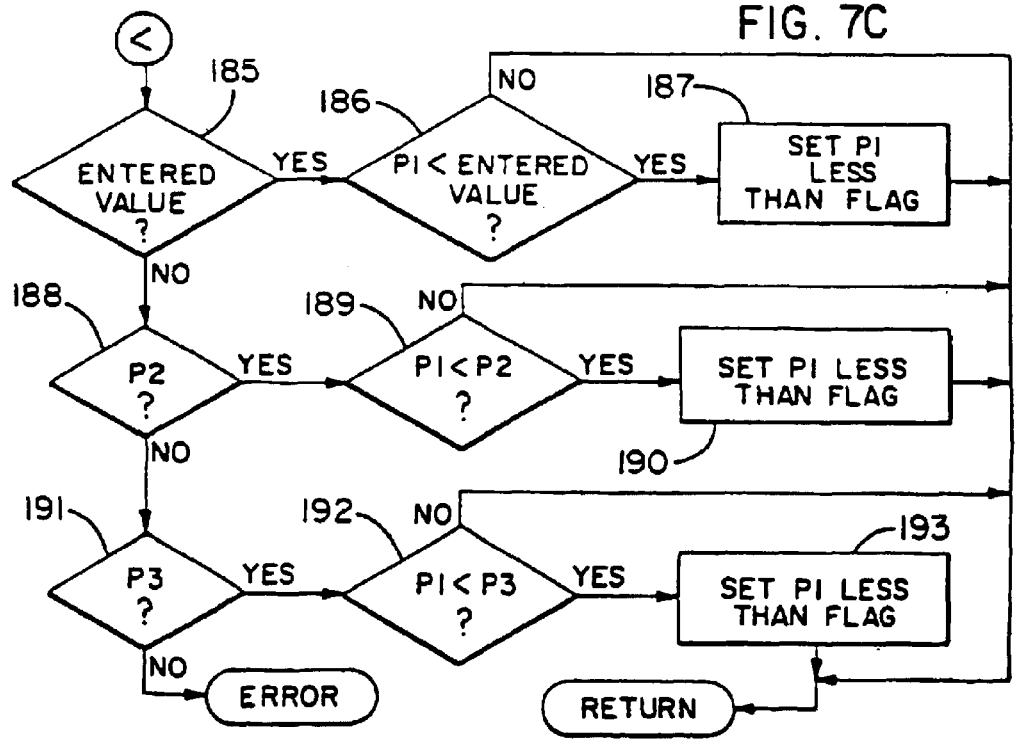
Figure 7D:
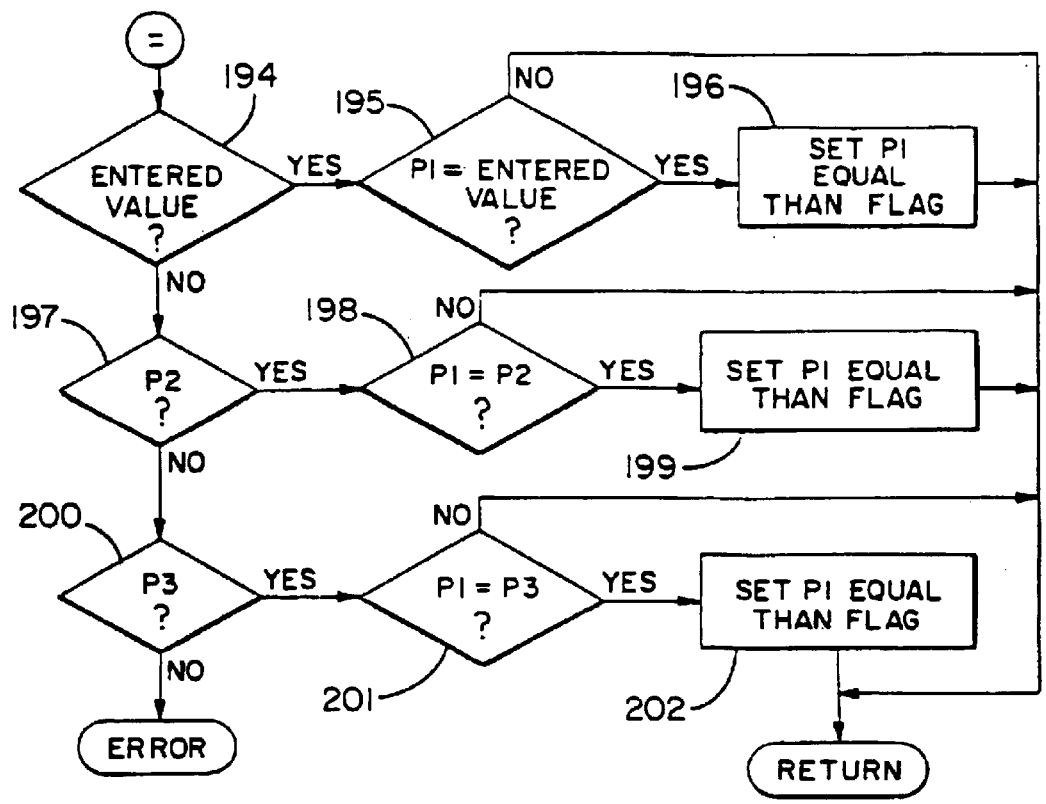

As illustrated in FIGS. 7C and 7D, the sub-routine performs similar steps to determine if upstream pressure is less than or equal to a logical alarm value 185–202. Furthermore, operations identical to those shown in FIGS. 7B–7D are performed for the downstream and auxiliary pressures to determine whether they are greater than, less than, or equal to specified logic alarm values. Since these operations are identical, separate flow charts illustrating these steps are not provided.

Figure 7E:
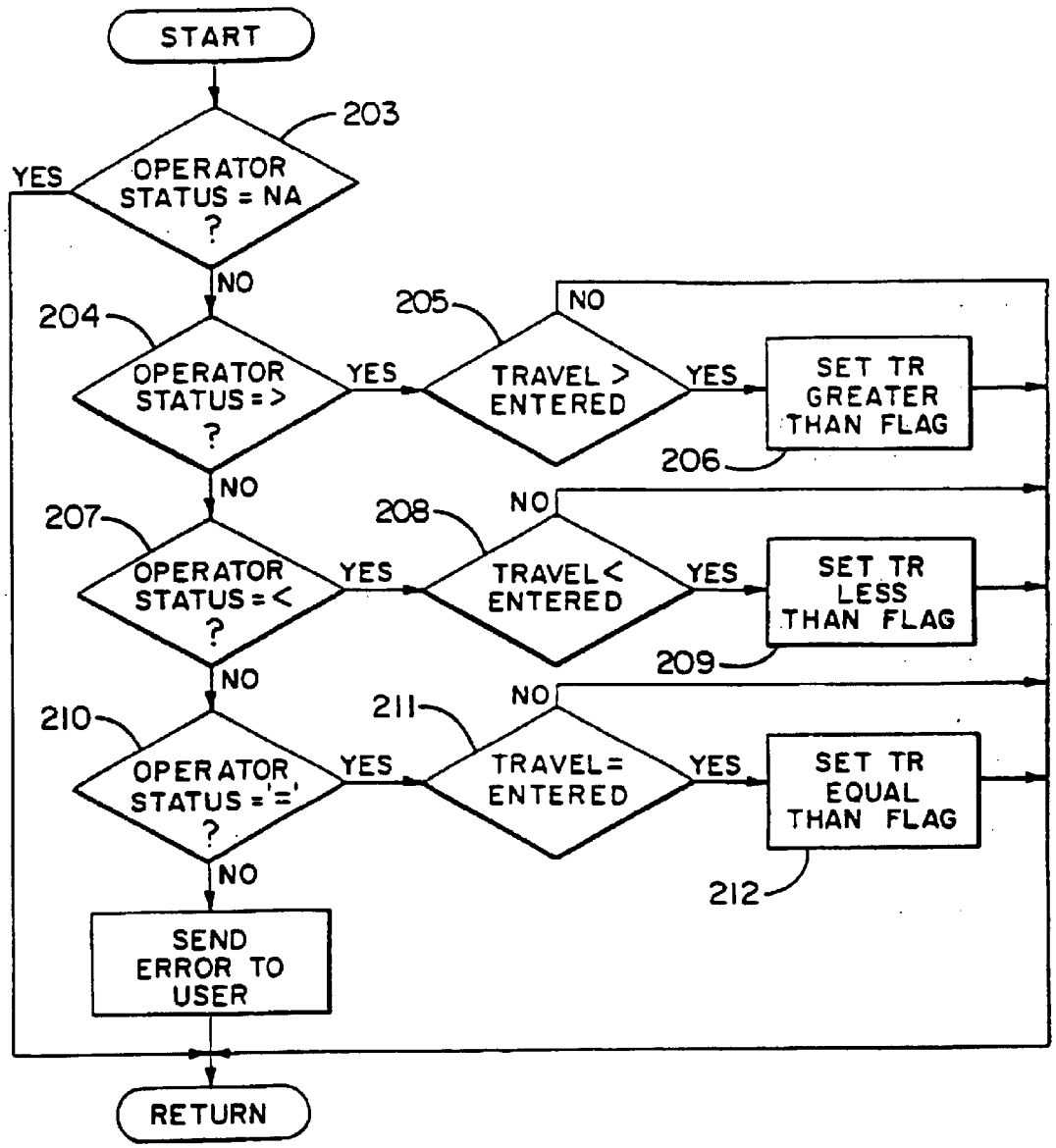

Turning to logic alarms based on travel 169 (FIG. 7A), a logic sequence flow chart is illustrated at FIG. 7E. Accordingly, the sub-routine first checks whether a travel position logic value has not been entered 203. If a traveled position logic value has been entered, the sub-routine determines whether the measured value must be greater than the logic value 204. If the logic operator is a greater than limit, the sub-routine determines whether the measured traveled position is greater than the entered value 205. If so, the travel greater than flag is set 206. If no "greater than" limit is used for travel, the sub-routine then checks for a "less than" limit 207. If a "less than" limit is detected, the sub-routine determines if the measured travel is less than the entered value 208. If so, the travel less than flag is set 209. If a "less than" value is not used, the sub-routine checks for an "equal to" operator limit 210. If an "equal to" limit is used, the sub-routine determines whether the measured travel equals the entered value 211. If so, the travel equal to flag is set 212. A similar sequence of steps may be used to determine if the calculated flow rate is greater than, less than, or equal to a logic flow alarm value, as called for at step 170 of FIG. 6.

Based on the logic flags which may be set, certain logic alarms may be triggered based on a comparison of two of the measured parameters. For example, a shut off problem alarm may be set to trigger when travel position equals zero and downstream pressure is increasing (present downstream pressure is greater than immediately preceding measured downstream pressure). When the appropriate operational conditions exist to set the corresponding logic flags, the shut off problem alarm is triggered, which may indicate that fluid is leaking through the pressure regulator possibly due to damage to the throttling element. Another logic alarm may be generated when the travel value is greater than zero and the downstream pressure signal is decreasing, which may indicate a broken stem. Yet another logic alarm may be generated when the travel value is greater than zero and the upstream pressure signal is increasing, which may also indicate a broken stem or other problem with the regulator. A further logic alarm may be triggered when the travel signal is greater than zero and the downstream pressure signal is greater than a user entered downstream pressure limit, which may indicate a problem with the pilot which controls the regulator. Other logic alarms may be entered which take into account the various measured and calculated values, so that other potential problems with the regulator may be immediately indicated.

The memory associated with the processor preferably includes an alarm log which tracks the date, time, and type of alarm. The alarm log is accessible by an outside communication device to allow an alarm history to be retrieved. Furthermore, the processor preferably includes a report by exception (RBX) circuit which automatically communicates any alarm conditions to a remotely located host computer. Accordingly, potential problems in the pipeline are quickly reported, and the particular component or damaged area is identified.

Figure 8:
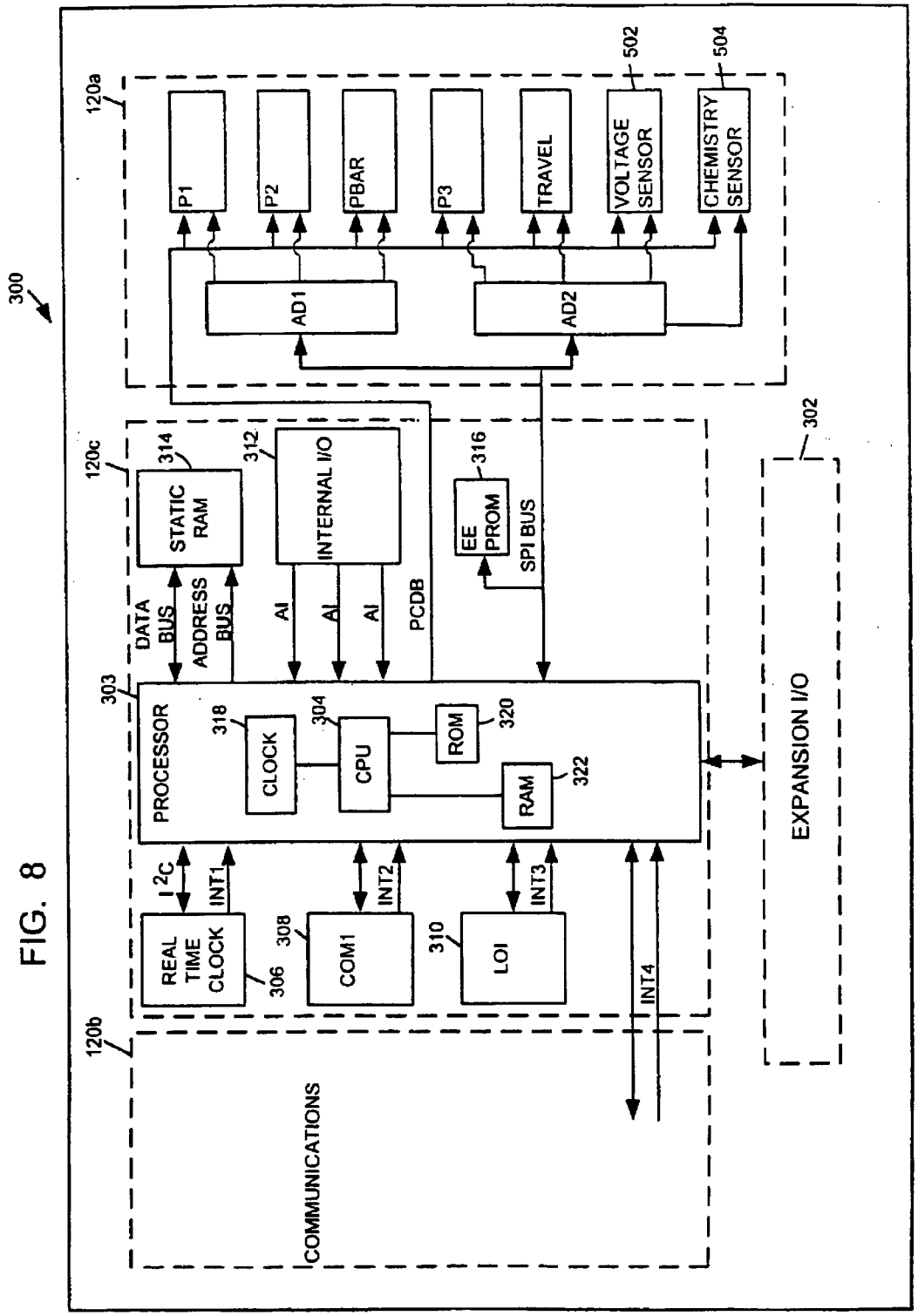
FIG. 8 is a block diagram representation of low power circuitry for the gas flow regulator.

The gas flow regulator 10 is typically powered by a battery power source and is specifically adapted to minimize the amount of power consumed. Referring to FIG. 8, a low power circuit 300 engineered for minimum power consumption either by low static power consumption or by utilizing switched duty cycle operation is shown. The gas flow regulator 10 includes a low power circuitry 300 where individual components of the low power circuitry are normally placed in a sleep mode and powered on as they are needed to perform measurement or diagnostics operations. The low power circuit 300 generally includes the processor board 120c communicatively coupled to the communications board 120b and to the sensor I/O board 120a. The processor board 120c is also adapted to support an expansion 10 board 302.

The processor board 120c includes a processor 303 that is communicatively coupled to a real time clock (RTC) module 306, a communications module 308, a local operator interrupt (LOI) module 310, an internal input output (I/O) module 312, an external static random access memory (static RAM) module 314 and an electronic erasable programmable read only memory (EEPROM) module 316. Each of the modules 306–316 may be disposed on individual printed circuit boards or one or more printed circuit boards.

The processor 303 includes a CPU 304 an internal clock 318, a flash read only memory (flash ROM) 320 and a processor random access memory (processor RAM) 322 and provides the control and timing for communications with each of the boards 102a, 102b, 302 and modules 306–316 and controls the activation and power distribution to the different modules 306–316 and sensor 34, 35, 44, 115.

The CPU 304 operates in three different modes: awake mode where the CPU 304 consumes the amount of power necessary to maintain full operations, sleep mode where the CPU 304 consumes a reduced amount of power that is necessary to maintain operations of its internal systems and deep sleep mode where the CPU 304 essentially shuts itself down and operates on a minimal amount of power. In sleep mode, the operating frequency of the CPU 304 is reduced to conserve power. In deep sleep mode, the CPU 304, the internal clock 318 and the internal RAM 322 are all powered off to further conserve power.

The internal clock 318, among other functions, wakes up the CPU 304 from sleep mode in accordance with the configured sample rate supplied by the operator. The flash ROM 320, a non-volatile memory that does not require power to maintain its contents, contains the operational firmware. The processor RAM 322 is a static memory that is used for the storage of non-initialized variables and program stack. The processor RAM 322 is volatile and must be initialized on every power up.

The RTC module 306 performs the time of day and calendar functions that are used to stamp the logs and history, communication call out scheduling, communication power control and alarming based on time of day and calendar. The RTC module 306 communicates with the CPU 304 via a I$^2$C bus and an external interrupt bus INT1. Prior to entering deep sleep mode, the CPU 304 typically issues instructions to the RTC module 306 to issue an external interrupt INT1 to wake it up at a designated time that is based on the configured sampled rate.

The communication module 308 includes a RS485 driver that is adapted to communicate with external devices or tools that may be multi-dropped on a single RS485 loop. An interrupt signal generator, within the communication module 308 issues an interrupt signal TNT2 to the CPU 304 when external communication is requested. This interrupt signal INT2 causes the CPU 304 to activate the RS485 driver enabling two way communication between the processor and the external device or tool. If the CPU happens to be in sleepmode or deep sleepmode, the interrupt signal wakes up the CPU 304.

The LOI module 310 includes a RS232 driver and is intended for connection to a configuration tool on-site. When the LOI module 310 senses activity indicating that external communications are being requested, an interrupt signal INT3 is issued to the CPU 304. If the CPU 304 happened to be in sleep mode or deep sleep mode, the interrupt signal INT3 wakes up the CPU 304. Upon receiving the interrupt signal INT3, the CPU 304 powers up the LOI module including the RS232 driver to enable two-way communication with the configuration tool.

The internal I/O module 312 is communicatively coupled to the CPU 304 via a processor analog port A1. The CPU 304 regulates the power to the internal I/O module. The internal I/O module 312 is normally in a sleep mode to conserve power and is only powered on prior to and during the conversion of internal I/O signals. The internal I/O module 312 is configured to supply the CPU 304 with internal parameter data including board temperature, the voltage applied to the power terminals and the logic battery voltage. The logic battery voltage is the terminal voltage of the internal battery. The internal I/O module 312 also alerts the CPU 304 as to whether an optional communications card such as a RS 232 card, a 2400 baud modem, a CSC cell phone interface card, a Cellular Digital Packet Data cell phone interface card, a Code Division Multiple Access CDMA cell phone interface card or a radio interface card has been installed.

The EEPROM module 316 is used to store the configuration, calibration and security parameters for the gas flow regulator 10. This memory is non-volatile and does not require power to maintain its contents. The static RAM module 314 is a static memory that is used to store initialized variables, alarm logs, event logs, and historical logs. A section of the static RAM Module 314 is reserved for firmware downloads such as firmware upgrades, and functionality enhancements. This facilitates the performance of security and reliability checks prior to programming the flash memory 320 with the firmware upgrades. Power to the static RAM module 314 is backed up using a replaceable lithium battery.

The communication board 120b provides an interface for external communications with one or more outside devices, including a host or a master device. The communication module 120b is adapted to accommodate different types of communication cards requiring the use of different types of drivers. Upon the installation of a specific communication card, an analog signal identifying the type of the communication card installed, is generated by the communication card to the CPU 304. The CPU 304 uses the analog signal data to correctly initialize and interface to the communication driver on the communication card typically without operator intervention. The communication card includes an interrupt signal generator for issuing an interrupt signal INT4 to issue an interrupt to the CPU 304 when communications with an external communication device is requested. Responsive to the interrupt signal INT4 the CPU 304 to activates the driver on the communication card so that two-way communication is enabled between the external communication device and the CPU 304. The communication board 120b may configured for wired communication via for example, a modem card, an RS232 communication driver or wireless communication via for example, a cellular digital packet data (CDPD) modem. The communications board 120b may also be adapted to interface with other devices including a dial modem, other cellular devices, a radio device, a satellite, a Fieldbus® interface or a HART® interface.

The sensor I/O board 120c includes one or more analog to digital (A/D) converters AD1, AD2 to facilitate communications between the CPU 304 and the different sensors including first, second, third, and fourth pressure sensors 34, 35 115, 117 and the travel sensor 44. The CPU 304 communicates with the A/D converters AD1, AD2 via a serial peripheral interface bus SPI. The A/D converters AD1, AD2 are always powered to maintain calibration data but are normally placed in a sleep mode to minimize power consumption. The CPU 304 wakes up individual A/D converters AD1, AD2 as necessary to interface with individual sensors 34, 35, 44, 115, 117 to collect and convert sampled sensor readings.

The sensor I/O board 120c also includes a plurality of sensor interfaces including a first, second, third and fourth pressure sensor interfaces P1, P2, P3, PBAR, and a travel sensor interface TRAVEL. The CPU 304 regulates the power supplied to each of the different sensors 34, 35, 44, 115, 117 via the sensor interfaces P1, P2, P3, PBAR, TRAVEL. The power control data bus PCDB enables communications between the CPU 304 and the sensor interfaces P1, P2, P3, PBAR, TRAVEL. The sensors 34, 35, 44, 115, 117 are normally powered off and powered up only when it is necessary to take a reading or sample. The CPU 304 issues a power up command to the appropriate pressure interface when required to power a particular sensor 34, 35, 44, 115, 117. Each sensor interface P1, P2, P3, PBAR, TRAVEL includes a voltage reference, a bridge amplifier and a power switch. The power switch controls the power supplied to the voltage reference, the bridge amplifier and the sensor 34, 35, 44, 115, 117. The voltage reference powers the sensor, provides a reference input to the A/D converters AD1, AD2 and provides a reference output to the bridge amplifier. The use of the reference signal at multiple points makes the low power circuit 304 ratiometric thereby reducing the effects of drift in the reference and on the accuracy of the A/D conversions. The sensor 34, 35, 44, 115, 117 may be adapted to operate in an operational mode and a sleep mode. In sleep mode, the sensors 34, 35, 44, 115, 117 consume a reduced amount of power than when in operational mode. The sensors 34, 35, 44, 115, 117 may be placed in a sleep mode when they are not actually being used to sample data to conserve power. For example, the sensors 34, 35, 44, 115, 117 may be placed in sleep mode after they have been initialized and then activated or placed in operational mode when sampled data is required by the CPU 304. Similarly, the A/D converter may also be adapted to operate in a sleep mode and an operational mode. In an alternative embodiment the sensors 34, 35, 44, 115, 117 and the A/D converters may simply be powered off, as opposed to being placed in sleep mode, when not in use.

The expansion I/O 302 is typically contained on a single card that is interfaced through a single connector to an expansion serial peripheral interface SPI bus, an analog port, control outputs and status inputs. The connector also routes the field signals from the field terminations to the expansion I/O card 302. The functionality of the expansion I/O board 302 is typically determined on an application by application basis.

Figure 9:
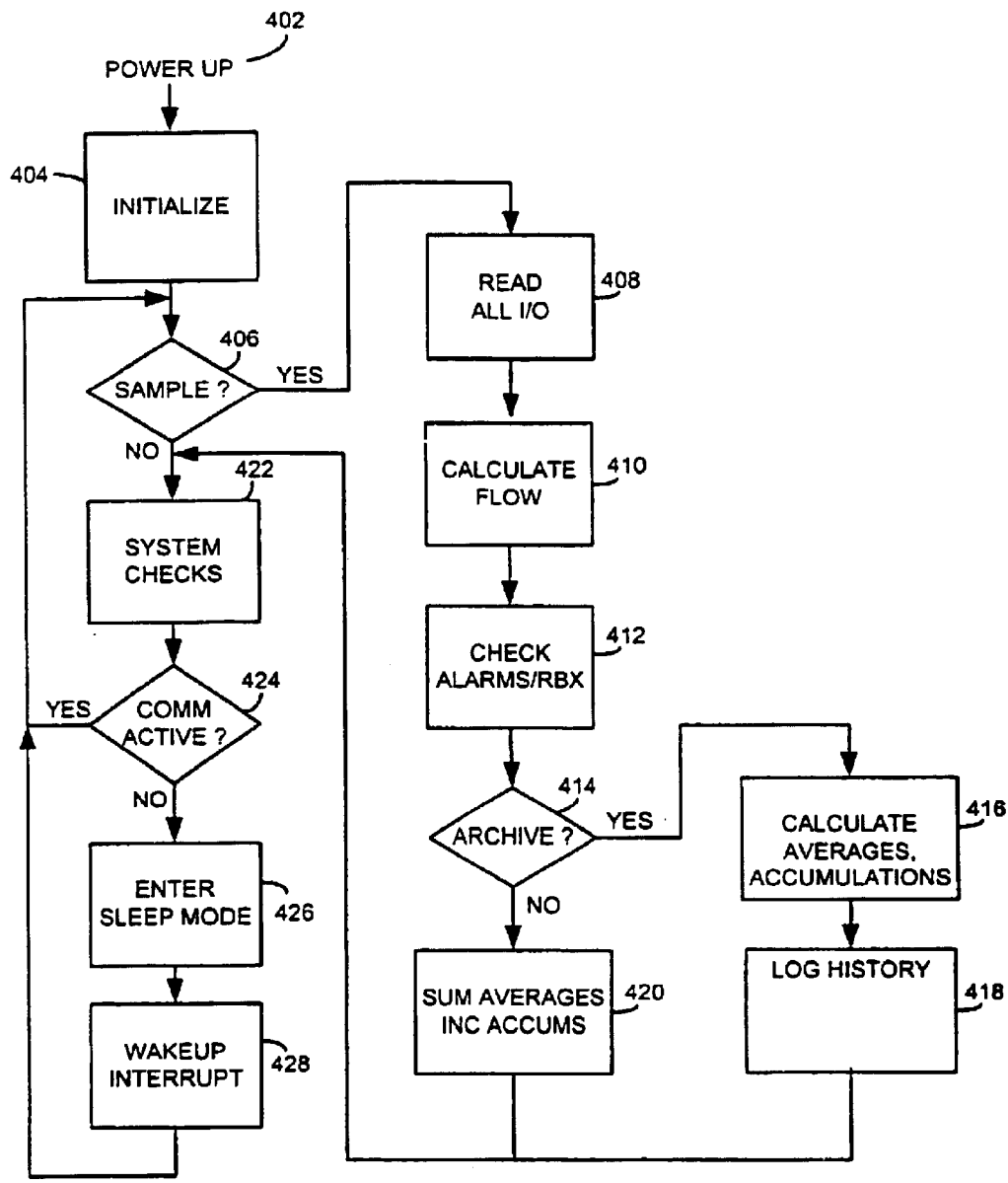
FIG. 9 is a flow chart schematically illustrating the overall operation of the low power circuitry.

Referring to FIG. 9, a flowchart providing an overview of the operation of the gas flow regulator 10 firmware running on the low power circuitry 300 is shown. The firmware is stored in the flash memory 320. The operation of the firmware is initiated in response to a command to supply power to the low power circuitry components at step 402 where the power up command may be generated either by the CPU 304 or an operator.

At step 404, the CPU 304 begins an initialization process whereby the low power circuitry 300 and the sensors 34, 35, 44, 115, 117 are initialized in accordance with an operator supplied configuration to obtain and process periodic sensor readings or samples and perform flow rate calculations. The operator can configure the gas flow regulator 10 to sample sensor data at different rates at various time intervals.

The CPU 304 then determines at step 406, based on the operator supplied configuration, whether a sampling operation should be initiated. If the configuration indicates that the CPU 304 should sample the sensor readings, the CPU 304 begins by powering on selected sensors 34, 35, 44, 115, 117 and selected components of the low power circuitry 300 as they are required to obtain samples of the sensor readings from the A/D converters AD1, AD2 at step 408. Each of the sensors and the low power circuitry components are powered off as soon as they complete their role in the sampling process. The collected data includes readings from the upstream pressure sensor 34, the downstream pressure sensor 35, the auxiliary pressure sensor 115, the barometric pressure sensor 117 and the travel sensor 44. Other collected parameters include the input voltage, the battery voltage, the battery chemistry and the ambient board temperature. At step 410, the CPU 304 uses the collected sensor data to calculate the flow rate. Then, the CPU 304 compares each of the collected readings and the calculated flow rate against operator supplied upper and lower limits to determine if any of the values are out of range or trigger an alarm condition at step 412. The CPU 304 determines if any alarms have changed state, such as from a set alarm condition to a clear alarm condition or from a clear alarm condition to a set alarm condition and logs its findings in the alarm log. When an alarm is logged, the CPU 304 files a report by exception (RBX) and automatically communicates the alarm condition to the remotely located host computer via the communication module 120b. Accordingly, potential problems in the pipeline are quickly reported, and the particular component or damaged area is identified At step 414, the CPU 304 determines whether each of the collected readings and the calculated flow rate should be archived based on a configured archive rate. If the CPU 304 determines that a particular parameter, such as for example a collected reading or a calculated flow rate should be archived, at step 416 the CPU 304 calculates an average value and an accumulated value for that parameter and then logs the values in the log history. The archive rate for each of the parameters are configurable by the operator and can range from archiving once a minute to once every sixty minutes.

If the CPU 304 determines that a particular parameter is not required to be archived, the CPU 304 adds the value of the parameter to a running sum of that parameter's values and keeps track of the number of parameter values that have been summed at step 420 in the event the CPU 304 is required to calculate an average value for that parameter.

Once the sampling process is complete, at step 422, the CPU 304 issues a command to perform system checks and diagnostics. The system diagnostics process is performed to verify that the low power circuitry is operating properly, to act on any pending RBX requests, to ensure that the latest firmware configuration is being utilized, to monitor firmware updates, to monitor the battery performance and to ensure that the gas pressure regulator 10 is performing within operational limits. Specifically, the CPU 304 monitors the gas pressure regulator system power for proper operating ranges in accordance with the low alarm limits, the low-low alarm limits, the high alarm limits and the high-high alarm limits. Depending on the battery voltage levels, the configured sample rates, the internal clock rates, the RTC clock rates and the communication levels, the appropriate gas pressure regulator systems are adjusted to conserve power and increase battery life. Under very low power conditions, power may even be removed from portions of the low power circuitry 300 to further conserve power. Once the system checks are complete, the CPU 304 is placed in a sleep mode so that it operates at a reduced operating frequency thereby reducing the amount of power consumed.

The CPU 304 then checks the different communication systems within the low power circuitry 300, such as the communication module 308, the LOI module 310 and the communication board 120b to see if any of the communication ports are active at step 424. If a communication port is active, the CPU 304 remains awake and returns again to step 406 to determines whether the sampling process should be repeated and performs the systems checks again at step 422.

If no communication ports are active, the CPU 304 issues a command to the RTC to wake up the CPU 304 via an external interrupt INT1 at a designated time and then enters into the deep sleep mode to conserve power at step 426. While the CPU 304 is in deep sleep mode, the CPU 304 may be woken up via an external interrupt INT2, INT3, INT4 issued by for example the LOI module 310, the communication module 308 or the communication board 120*b*. When the designated period of time has passed, the RTC issues an external interrupt INT1 to the CPU 304 at step 428 and the CPU wakes up, returns to step 404 again and repeats the entire process again.

Figure 10:
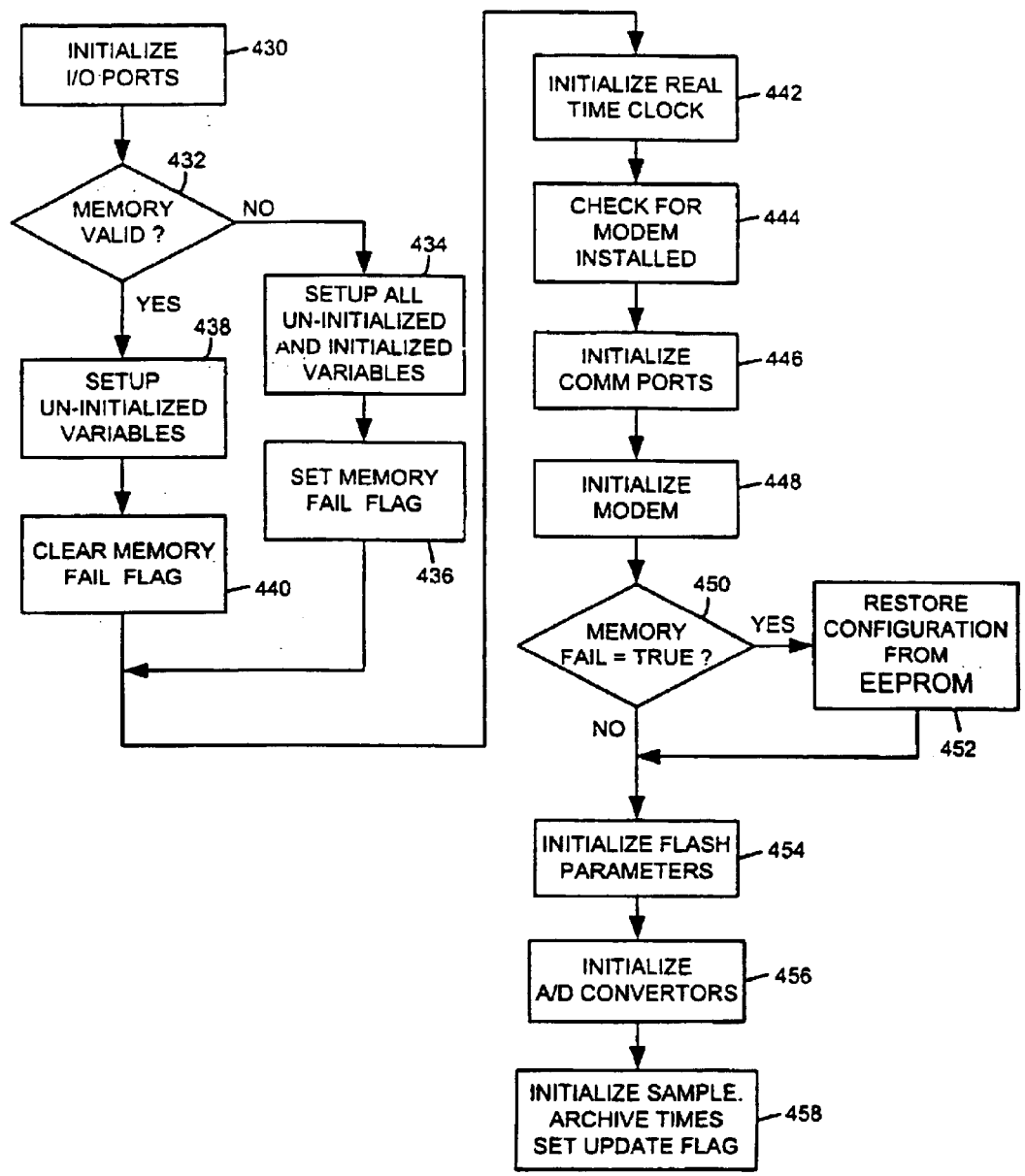
FIG. 10 is a flow chart schematically illustrating the initialization process as implemented by the low power circuitry.

Referring to FIG. 10, the initialization process of step 404 is described in greater detail. As mentioned previously, the initialization process is activated in response to a command to supply power to the low power circuitry components at step 402. The CPU 304 begins by configuring the different input/output ports to assign proper signal direction and default signal levels for disabling or powering down the low power circuitry hardware at step 430. The CPU 304 also sets up the port functions for the communication board 120*c*, the communication module 308, the LOI module 310, the A/D converters AD1, AD2, and the timers including the RTC 306.

At step 432, the CPU 304 then performs a validity check to determine whether the static RAM 314 contains a valid program configuration. Specifically, three different areas of static RAM 314 are checked for known configuration patterns. If any one of the three different areas do not match the known configuration pattern, static RAM memory 314 is considered invalid. If the static RAM memory 314 is invalid, the CPU 304 initializes the entire memory, including all of the un-initialized and initialized variables at step 434. The static RAM memory flag is then set at step 436. If the RAM memory 314 is valid, the CPU 304 initializes, only the un-initialized variables at step 438 and clears the static RAM memory flag at step 440.

The CPU 304 then sets up a communication link with the RTC module 306 and checks the RTC 306 for proper operation at step 442. If the RTC 306 is not operating properly or power supplied to the RTC 306 has been lost, the CPU 304 re-initializes the RTC 306 with the proper date and time functions. The CPU 304 then checks to see if a modem has been installed at step 444. If a modem has been installed, the CPU 304 initializes the modem and then powers the modem down. The modem is powered down prior to powering up the remaining low power circuitry hardware to limit the maximum current drawn during startup.

At step 446, the communication ports in the communication board 120*c*, the communication module 308 and the LOI module 310 are initialized in accordance with the configured baud rate, data bits, stop bits, and parity. The interrupts INT2, INT3. INT4 to initiate a communication via the communication ports remain disabled during the initialization process to prevent communications from being initiated during the remainder of the initialization process. Any installed modems are then configured for operation at step 448.

Then at step 450, if the static RAM 314 was found to be invalid at step 432, the CPU 304 checks to see if a previously saved memory configuration was stored in the EEROM 316. If a previously saved memory configuration is found, it is loaded into the static RAM 314 at step 452. If a previously saved memory configuration was not stored in the EEPROM 316, the CPU 304 uses default parameters to initialize the static RAM 314.

At step 454, the flash ROM parameters are initialized. Updates to the firmware stored in the flash ROM 320 are typically performed by the operator. The flash ROM parameters govern the updating process, provide error checking, and validation. Next at step 456, the A/D converters AD1, AD2 are initialized and calibrated for operation. Once the initialization process is complete, the A/D converters AD1, AD2 are placed in a sleep mode to conserve power. At step 458, the CPU 304 validates the configured sample and archive periods. The CPU 304 checks to ensure that there is at least one sample per archive period. The sample flag is set so that sampling process begins immediately after the completion of the initialization process 404.

Figure 11:
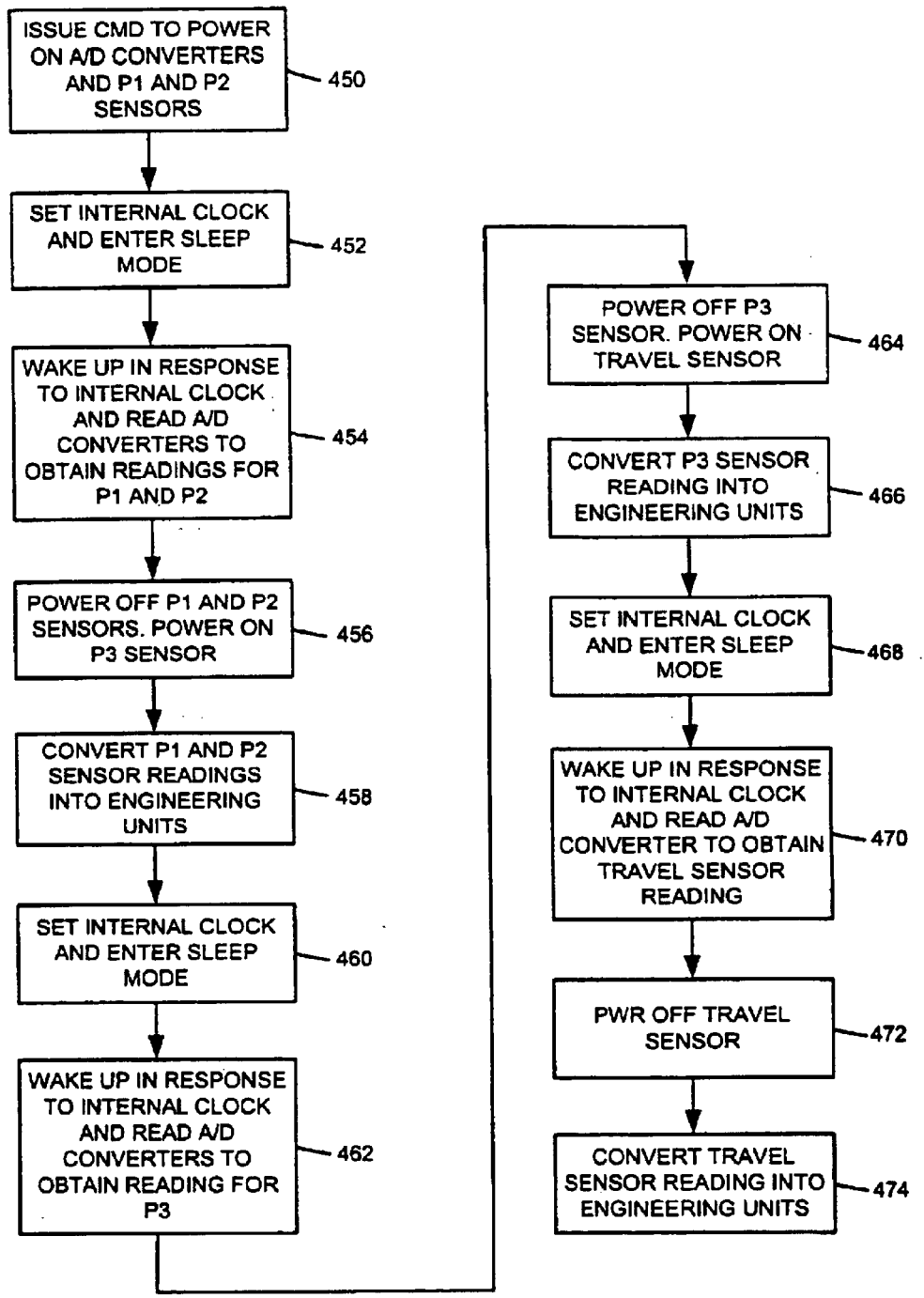
FIG. 11 is a flow chart schematically illustrating an example of a sampling sequence adapted to conserve battery power as implemented by the low power circuitry.

The sampling sequence employed by the gas pressure regulator 10 to sample the different I/O parameters such as the sensor readings, various low power circuitry parameters and battery power levels is specifically designed to minimize battery power consumption. Only those sensors 34, 35, 44, 115, 117 and low power circuitry components necessary to perform a sampling operation are powered on and then powered off immediately after a sample is collected by the CPU 304. Referring to FIG. 11, an example of a sampling sequence employed by the CPU 304 in reading a selected set of pressure sensors 34, 35, 115 and the travel sensor 44 while minimizing battery power consumption, as may be performed at step 408 is shown.

The CPU begins by issuing a command to power on the A/D converters AD1, AD2, the upstream pressure sensor 34 and downstream pressure sensor 35 at step 450. The CPU 304, at step 452, sets the internal clock 318 to issue a wake up signal to the CPU 304 after designated time period has passed and enters into the sleep mode. The duration of the sleep period is based on the time it takes for the pressure sensors 34, 35 to warm up sufficiently to provide accurate readings. An example of the duration of such a sleep period may be fifty milliseconds. Upon being woken up by the internal clock 318 at step 454, the CPU 304 reads the appropriate A/D converters AD1, AD2 to obtain a sample reading of the pressure sensors 34, 35. The CPU 304 then issues a command to power off the power sensors 34, 35 and a command to power on the auxiliary power sensor 115 at step 456. The CPU 304 converts the acquired samples of the upstream and downstream pressure readings into engineering units at step 458. The CPU 304 sets the internal clock 318 to issue a wake up signal to the CPU 304 after a designated period of time has lapsed and enters into sleep mode at step 460. When the CPU 304 is woken up by the internal clock 318 at step 462, the CPU 304 reads the appropriate A/D converter AD1, AD2 to obtain a reading from the auxiliary pressure sensor 115. The CPU 304 then issues a command to powers off the auxiliary power sensor 115 and issues a command to power on the travel sensor 44 at step 464. The CPU 304 converts the sample obtained from the auxiliary pressure sensor 115 into engineering units at step 466 and sets the internal clock 318 to issue a wake up signal at the appropriate time and enters into a sleep mode at step 468. Upon waking up in response to the internal clock signal 318, the CPU reads the appropriate A/D converter AD2 to obtain a reading from the travel sensor 44 at step 470. At step 472, the CPU 304 issues a command to power off the travel sensor and then converts the travel sensor reading into engineering units at step 474.

The CPU 304 is typically placed in deep sleep between sampling periods. Once the CPU 304 has completed sampling the sensors 34, 35, 44, 115, 117 and prior to entering deep sleep mode, the CPU 304 issues a command to the RTC 306 to issue an interrupt signal INT1 to the CPU 304 to place it in awake mode, in other words in operational mode, after a predetermined period of time. The predetermined period of time corresponds to the time interval between two consecutive sampling periods and is based on the configured sampling rate. When in deep sleep mode, the CPU 304 can also be placed in awake mode in response to an interrupt signal indicating that an external communication with a communication device is being requested.

While the example has been described with a selected set of sensors, a sampling sequence involving the reading of a fewer number of sensors or a greater number of sensors is considered to be within the scope of the invention. For example, the CPU 304 may obtain readings from the barometric pressure sensor 117, readings of the battery level and parameters relating to the performance of the processor board 120c. Alternative sampling sequences involving the powering on of selected components as they are required to obtain sensor readings and then subsequently powering off of selected components may be adapted without departing from the spirit of the invention.

As mentioned previously, the gas flow regulator 10 is powered by a battery and has a known power demand. The gas flow regulator power demand is typically a function of the configured sample rate. In other words, the higher the sample rate of the sensors 34, 35, 44, 115, 117, the greater the amount of power consumed. The CPU 304 monitors the battery capacity levels and can typically provide an estimated replacement date for the battery. The sensed battery chemistry is used to identify the type of battery being used to power the gas flow regulator 10. For example, the sensed battery chemistry can be used to determine if the battery being used is a lead acid type battery or a lithium type battery. The CPU 304 determines the battery capacity remaining based on a sensed battery terminal voltage, a sensed battery chemistry and the known gas flow regulator power demand. The CPU 304 may also use data associated with environmental factors such as for example sensed battery temperature to further adjust the value of the remaining battery capacity.

Figure 12:
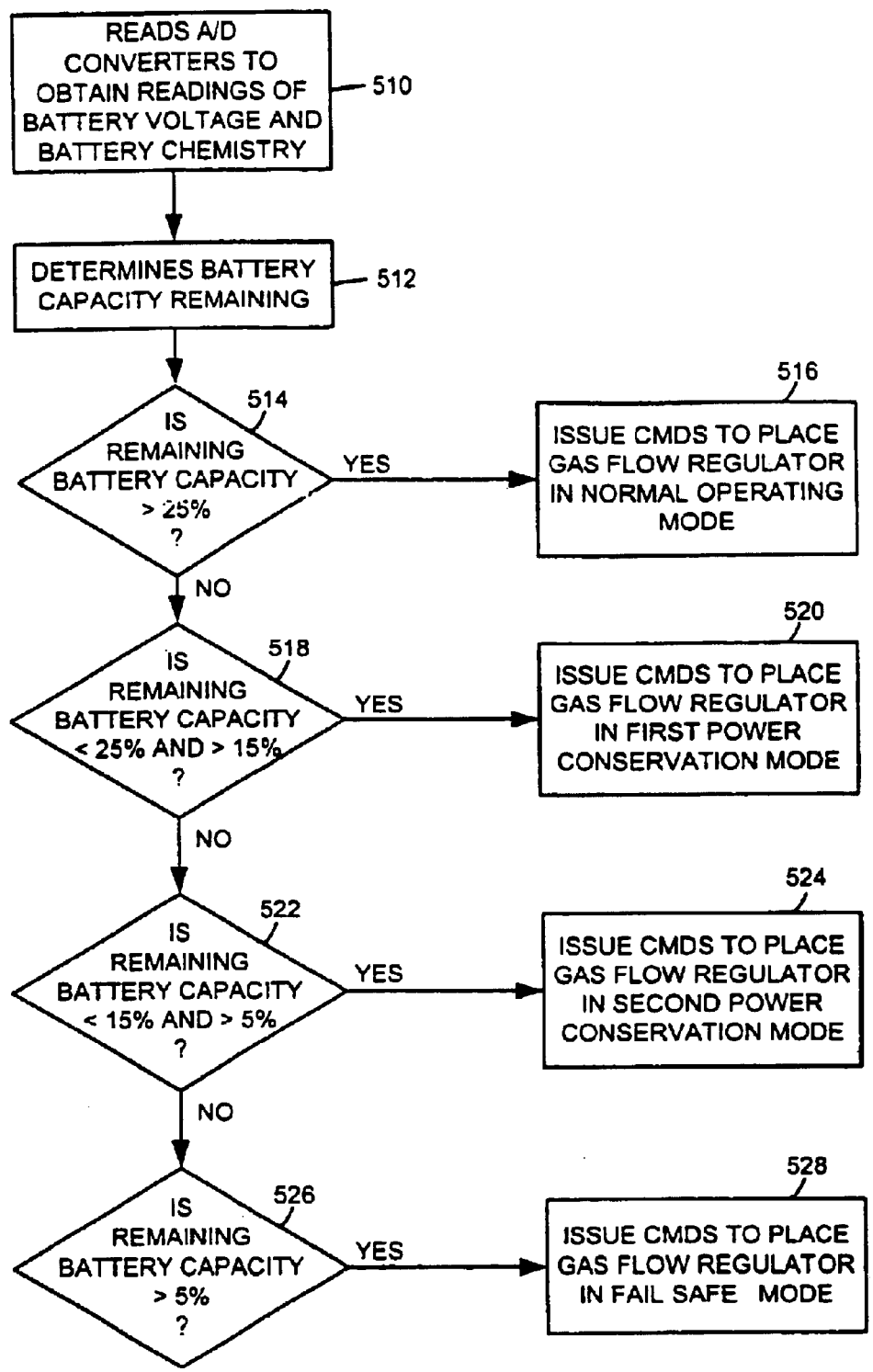
FIG. 12 is a flow chart schematically illustrating a method of determining an operating mode for the gas flow regulator.

Referring back to FIG. 8, the battery voltage sensor 502 and the battery chemistry detector 504 are communicatively coupled to an A/D converter AD2. The CPU 304 samples the data read by each of the sensors 502, 504 via the A/D converter AD2. Referring to FIG. 12, the gas flow regulator 10 is adapted to operate in one of four battery operating modes: a normal mode, a first power conservation mode, a second power conservation mode and a fail safe mode. The CPU 304 places the gas flow regulator 10 in the appropriate operating mode based on the remaining battery capacity. Specifically, the battery voltage sensor 502 senses the battery terminal voltage. The A/D converter AD2 converts the sensed battery terminal voltage into a digital signal representative of the sensed battery terminal voltage. The CPU 304 reads the appropriate A/D converters AD2 to obtain the readings of the battery terminal voltage and the battery chemistry at step 510 and determines the remaining battery capacity at step 512. The capacity of the battery in use and a set of threshold voltages or threshold capacities are stored in memory. The CPU 304 compares the sensed battery voltage to each of the threshold capacities to determine whether to operate the gas flow regulator 10 in normal operating mode, a first power conservation mode, a second power conservation mode or in a fail safe mode. The logic unit that performs the comparison function is a component of the low power circuitry firmware.

At step 514, the CPU 304 then determines if the battery is operating at a threshold capacity of greater than 25% of its full operating capacity. If the battery is operating at a threshold capacity of greater than 25%, the CPU 304 issues the appropriate commands to place the gas flow regulator 10 in normal operating mode at step 516. If the battery is operating at a level of less than or equal to 25%, the CPU 304 determines if the battery is operating within a range of less than or equal to a threshold capacity of 25% and greater than or equal to a threshold capacity of 15% of full battery capacity at step 518. If battery is operating within this range, the CPU 304 issues the appropriate commands to place the gas flow regulator 10 in the first power conservation mode at step 520.

At step 522, the CPU 304 determines if the battery is operating within a range of less than or equal to a threshold capacity of 15% and greater than a minimum threshold capacity of 5% of full battery capacity. If the battery is determined to be operating within this range, the gas flow regulator 10 is placed in the second power conservation mode at step 524. At step 526, the CPU 304 determines if the battery is operating below a minimum threshold capacity of 5% of full battery capacity. If the CPU 304 determines that the battery is operating below the minimum threshold capacity, the gas flow regulator 10 is placed in a fail safe mode at step 528.

Referring now to FIG. 13, the commands issued by the CPU 304 to place the gas flow regulator 10 in the first power conservation mode are described. At step 530, the rate at which sensor readings, such as pressure sensor readings and travel sensor readings, are sampled is reduced to a first power conservation level and at step 532, the clock rate of the internal clock 318 is reduced. The low alarm is set, time stamped and logged at step 534. The event logs, the history logs and the alarm logs are still maintained in the first power conservation mode. While in the first power conservation mode, the occurrence of certain pre-defined events may require that the clock rate be increased. Such pre-defined events include for example, an external interrupt from a communication device such as, the communication board 120b, the communication module 308 or the LOI module 310. At step 536, the CPU checks to see if the clock rate is required to be increased in response to a pre-defined event. If the CPU 304 determines that the clock rate needs to be increased, the clock rate is increased until the performance of the function requiring the higher clock rate is completed at step 538. Then the CPU 304 issues a command to reduce the clock rate again to conserve battery energy at step 540.

Referring to FIG. 14, the commands issued by the CPU 304 to place the gas flow regulator 10 in the second conservation mode are described. At step 542, the rate at which sensor readings, such as pressure sensor readings and travel sensor readings, are sampled is further reduced to a second power conservation level, a sample rate that is lower than the sample rate set at the first power conservation level. At step 544, all external communications, such as communications via the communication board 120b are terminated. The low-low alarm is set, time stamped and logged at step 546. The clock rate of the internal clock 318 remains at the reduced clock rate. The event logs, the history logs and the alarm logs continue to be maintained in the second power conservation mode.

Referring to FIG. 15, the commands issued by the CPU 304 to place the gas flow regulator 10 in the fail safe mode when the main battery is considered to be dead are described. As mentioned previously, the static RAM 314 is used to store the event logs, the history logs and the alarms logs. At step 548, a back-up battery, such as a replaceable lithium battery, is activated to supply power to the static RAM 314 thereby maintaining the event logs, the history logs and the alarm logs. All of the sensors 34, 35, 44, 115, 117, 502, 504 the A/D converters AD1, AD2 and the components of the processor board 120c, including the CPU 304 are powered off at step 550 to conserve power. Only the static RAM 314 remains powered. No new data samples are taken or stored until the main battery is replaced.

It will be appreciated while specific battery capacity thresholds such as for example, 25%, 15% and 5% of full battery operating capacity, have been used to illustrate an embodiment of the invention, the battery capacity thresholds are operator configured values and alternative battery capacity thresholds may be configured and applied without departing from the spirit of the invention. Additionally, while the described embodiment includes four gas flow regulator operating modes, the use of a greater or fewer number of operating modes are also considered to be within the scope of the invention.

The foregoing detailed description has been given for clearness of understanding only, and no unnecessary limitations should be understood therefrom, as modifications will be obvious to those skilled in the art.

What is claimed is:

1. A pressure regulator for controlling fluid in a pipeline, the pressure regulator being operated by a battery, comprising:
    a battery sensor adapted to sense an operation parameter of the battery, and responsively generate an operation parameter signal;
    a memory adapted to store a threshold capacity value of the battery, and responsively generate a threshold capacity signal; and
    a controller unit for controlling power consumption of the pressure regulator, wherein the controller unit is adapted to receive the operation parameter signal and the threshold capacity signal, and responsively generate a command signal to operate the pressure regulator in at least one of a plurality of operating modes.

2. The pressure regulator of claim 1, wherein the controller unit includes a processor having a computation unit and a logic unit, wherein the computation unit is adapted to generate a remaining capacity signal indicative of the remaining capacity of the battery in response to the operation parameter signal, and wherein the logic unit is adapted to compare the remaining capacity signal and the threshold capacity signal, and responsively generate the command signal to operate the pressure regulator in the at least one of the plurality of operating modes in accordance with a logic routine.

3. The pressure regulator of claim 2, wherein the plurality of operating modes includes a power conservation mode and a failsafe mode, wherein the logic routine operates the pressure regulator in the power conservation mode when the remaining capacity signal is less than the threshold capacity signal, and wherein the logic routine operates the pressure regulator in the failsafe mode when the remaining capacity signal is equal to zero.

4. The pressure regulator of claim 3, further including a back-up battery coupled to the pressure regulator, wherein the logic routine is adapted to activate the back-up battery in the failsafe mode.

5. The pressure regulator of claim 3, wherein the logic routine is adapted to deactivate the battery sensor in the failsafe mode.

6. The pressure regulator of claim 3, wherein the logic routine is adapted to shutdown the processor in the failsafe mode.

7. The pressure regulator of claim 3, wherein the threshold capacity value includes a first threshold value and a second threshold value, and wherein the power conservation mode includes a first power conservation mode and a second power conservation mode, wherein the memory is adapted to generate a first threshold signal in response to the first threshold value,
    wherein the memory is adapted to generate a second threshold signal in response to the second threshold value, wherein the logic routine is adapted to operate the pressure regulator in the first power conservation mode when the remaining capacity signal is less than the first threshold signal, and wherein the logic routine is adapted to operate the pressure regulator in the second power conservation mode when the remaining capacity signal is less than the second threshold signal.

8. The pressure regulator of claim 7, wherein the logic routine is adapted to generate an alarm in at least one of the first power conservation mode and the second power conservation mode.

9. The pressure regulator of claim 8, wherein the alarm includes a first alarm and a second alarm, wherein the logic routine is adapted to generate the first alarm in the first power conservation mode, and wherein the logic routine is adapted to generate the second alarm in the second power conservation mode.

10. The pressure regulator of claim 7, wherein the processor includes a clock adapted to provide a clock signal at a frequency, wherein the controller unit is adapted to receive the operation parameter signal at a sample rate corresponding to the frequency of the clock signal, and wherein the logic routine is adapted to reduce the frequency of the clock signal in one of the first power conservation mode and the second power conservation mode.

11. The pressure regulator of claim 10, wherein the logic routine is adapted to reduce the sample rate in at least one of the first power conservation mode and the second power conservation mode.

12. A controller unit adapted to control power consumption of a pressure regulator, the pressure regulator being operated by a battery, the controller unit comprising:
    a battery sensor adapted to sense an operation parameter of the battery, and responsively generate an operation parameter signal;
    a memory adapted to store a threshold capacity value of the battery, and responsively generate a threshold capacity signal; and
    a processor adapted to receive the operation parameter signal and the threshold capacity signal, and responsively generate a command signal to operate the pressure regulator in at least one of a plurality of operating modes.

13. The controller unit of claim 12, wherein the processor includes a computation unit, a logic unit, and a clock, wherein the clock is adapted to provide a clock signal at a frequency, wherein the computation unit is adapted to receive the operation parameter signal from the battery sensor at a sample rate corresponding to the frequency of the clock signal, and responsively generate a remaining capacity signal indicative of the remaining capacity of the battery, and wherein the logic unit is adapted to compare the remaining capacity signal and the threshold capacity signal and operate the pressure regulator in the at least one of the plurality of operating modes in accordance with a logic routine.

14. The controller unit of claim 13, wherein the plurality of operating modes includes a power conservation mode and a failsafe mode, wherein the logic routine is adapted to operate the pressure regulator in the power conservation mode when the remaining capacity signal is less than the threshold capacity signal, and wherein the logic routine is adapted to operate the pressure regulator in the failsafe mode when the remaining capacity signal is equal to zero.

15. The controller unit of claim 14, wherein the threshold capacity value includes a first threshold value and a second threshold value stored in the memory, and wherein the power conservation mode includes a first power conservation mode and a second power conservation mode, wherein the memory is adapted to generate a first threshold signal in response to the first threshold value, wherein the memory is adapted to generate a second threshold signal in response to the second threshold value, wherein the logic routine is adapted to operate the pressure regulator in the first power conservation mode when the remaining capacity signal is less than the first threshold signal, and wherein the logic routine is adapted to operate the pressure regulator in the second power conservation mode when the remaining capacity signal is less than the second threshold signal.

16. A method for controlling power consumption of a pressure regulator, the pressure regulator being operated by a battery, the method comprising the steps of:

providing a battery sensor for sensing an operation parameter of the battery;

storing a threshold capacity value of the battery;

operating the pressure regulator in at least one of a plurality of operating modes in accordance with a logic routine based on the operation parameter and the threshold capacity value.

17. The method of claim 16, including the steps of:

determining a remaining capacity value of the battery based on the operation parameter;

comparing the remaining capacity value and the threshold capacity value; and operating the pressure regulator in the at least one of the plurality of operating modes based on the comparison of the remaining capacity value and the threshold capacity value.

18. The method of claim 17, wherein the step of operating the pressure regulator includes the steps of:

operating the pressure regulator in a power conservation mode when the remaining capacity value is less than the threshold capacity value; and operating the pressure regulator in a failsafe mode when the remaining capacity value is equal to zero.

\* \* \* \* \*

UNITED STATES PATENT AND TRADEMARK OFFICE
CERTIFICATE OF CORRECTION

PATENT NO. : 6,903,659 B2
DATED : June 7, 2005
INVENTOR(S) : Richard J. Vanderah et al.

It is certified that error appears in the above-identified patent and that said Letters Patent is hereby corrected as shown below:

Column 12,
Line 35, please delete "to activates" and insert -- activates --.
Line 38, please delete "may configured" and insert -- may be configured --.
Line 50, please delete "35 115" and insert -- 35, 115 --.

Column 13,
Line 15, please delete "conversions. The sensor" and insert -- conversions. (NEW PARAGRAPH) The sensor --.

Column 14,
Line 62, please delete "to determines" and insert -- to determine --.

Column 16,
Line 47, please delete "to powers" and insert -- to power --.

Column 18,
Line 66, please delete "504 the" and insert -- 504, the --.

Signed and Sealed this

Twenty-third Day of August, 2005

JON W. DUDAS
*Director of the United States Patent and Trademark Office*